US011184155B2

(12) United States Patent
Rudzitis et al.

(10) Patent No.: US 11,184,155 B2
(45) Date of Patent: *Nov. 23, 2021

(54) CRYPTOGRAPHIC KEY MANAGEMENT FOR IMPORTED CRYPTOGRAPHIC KEYS

(71) Applicant: Amazon Technologies, Inc., Seattle, WA (US)

(72) Inventors: Aleksandrs J. Rudzitis, Seattle, WA (US); Alexis Lynn Carlough, Seattle, WA (US); Gregory Alan Rubin, Seattle, WA (US); Matthew John Campagna, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 389 days.

This patent is subject to a terminal disclaimer.

(21) Appl. No.: 16/174,033

(22) Filed: Oct. 29, 2018

(65) Prior Publication Data

US 2019/0068363 A1 Feb. 28, 2019

Related U.S. Application Data

(63) Continuation of application No. 15/239,725, filed on Aug. 17, 2016, now Pat. No. 10,116,440.

(Continued)

(51) Int. Cl.
*H04L 9/08* (2006.01)

(52) U.S. Cl.
CPC ............ *H04L 9/0822* (2013.01); *H04L 9/083* (2013.01); *H04L 9/0825* (2013.01); *H04L 9/0891* (2013.01)

(58) Field of Classification Search
CPC ..... H04L 9/0822; H04L 9/0825; H04L 9/083; H04L 9/0891
See application file for complete search history.

(56) References Cited

U.S. PATENT DOCUMENTS

| 5,179,591 A | 1/1993 | Hardy et al. |
| 5,200,999 A | 4/1993 | Matyas et al. |

(Continued)

FOREIGN PATENT DOCUMENTS

| CN | 1254464 | 5/2000 |
| CN | 101515319 | 8/2009 |

(Continued)

OTHER PUBLICATIONS

Amazon, "Amazon Simple Storage Service API Reference," Mar. 1, 2006, XP55321136, retrieved from http://docs.aws.amazon.com/AmazonS3/latest/API/s3-api.pdf, pp. 1-413.

(Continued)

*Primary Examiner* — Nelson S. Giddins
(74) *Attorney, Agent, or Firm* — Davis Wright Tremaine LLP

(57) ABSTRACT

A cryptographic key management service receives a request to import a first cryptographic key. In response to the request, the service creates a public cryptographic key and a private cryptographic key. The private cryptographic key is encrypted using a second cryptographic key to create an import key token. The import key token and the public cryptographic key are provided in response to the request. The service receives an encrypted first cryptographic key, which the service decrypts using the private cryptographic key to obtain the first cryptographic key. The service stores the first cryptographic key and enables its use for the performance of cryptographic operations.

20 Claims, 9 Drawing Sheets

Related U.S. Application Data

(60) Provisional application No. 62/372,686, filed on Aug. 9, 2016.

(56) References Cited

U.S. PATENT DOCUMENTS

| | | |
|---|---|---|
| 5,497,421 A | 3/1996 | Kaufman et al. |
| 5,870,473 A | 2/1999 | Boesch et al. |
| 5,917,911 A | 6/1999 | Dabbish et al. |
| 5,956,404 A | 9/1999 | Schneier et al. |
| 6,084,969 A | 7/2000 | Wright et al. |
| 6,097,817 A | 8/2000 | Bilgic et al. |
| 6,185,316 B1 | 2/2001 | Buffam |
| 6,393,563 B1 | 5/2002 | Maruyama et al. |
| 6,397,261 B1 | 5/2002 | Eldridge et al. |
| 6,453,416 B1 | 9/2002 | Epstein |
| 6,601,172 B1 | 7/2003 | Epstein |
| 6,643,774 B1 | 11/2003 | McGarvey |
| 6,711,679 B1 | 3/2004 | Guski et al. |
| 6,826,686 B1 | 11/2004 | Peyravian et al. |
| 6,851,054 B2 | 2/2005 | Wheeler et al. |
| 6,957,393 B2 | 10/2005 | Fano et al. |
| 6,959,394 B1 | 10/2005 | Brickell et al. |
| 6,985,583 B1 | 1/2006 | Brainard et al. |
| 7,010,689 B1 | 3/2006 | Matyas et al. |
| 7,073,195 B2 | 7/2006 | Brickell et al. |
| 7,139,917 B2 | 11/2006 | Jablon |
| 7,228,417 B2 | 6/2007 | Roskind |
| 7,320,076 B2 | 1/2008 | Caronni |
| 7,512,965 B1 | 3/2009 | Amdur et al. |
| 7,685,430 B1 | 3/2010 | Masurkar |
| 7,721,322 B2 | 5/2010 | Sastry et al. |
| 7,757,271 B2 | 7/2010 | Amdur et al. |
| 7,765,584 B2 | 7/2010 | Roskind |
| 7,836,306 B2 | 11/2010 | Pyle et al. |
| 7,890,767 B2 | 2/2011 | Smith et al. |
| 7,913,084 B2 | 3/2011 | Medvinsky et al. |
| 7,917,764 B2 | 3/2011 | Futa |
| 8,006,289 B2 | 8/2011 | Hinton et al. |
| 8,024,562 B2 | 9/2011 | Gentry et al. |
| 8,041,954 B2 | 10/2011 | Plesman |
| 8,059,820 B2 | 11/2011 | Malaviarachchi et al. |
| 8,151,116 B2 | 4/2012 | van der Horst et al. |
| 8,275,356 B2 | 9/2012 | Hickie |
| 8,332,922 B2 | 12/2012 | Dickinson et al. |
| 8,370,638 B2 | 2/2013 | Duane et al. |
| 8,386,800 B2 | 2/2013 | Kocher et al. |
| 8,387,117 B2 | 2/2013 | Eom et al. |
| 8,418,222 B2 | 4/2013 | Gbadegesin et al. |
| 8,423,759 B2 | 4/2013 | Moreau |
| 8,453,198 B2 | 5/2013 | Band et al. |
| 8,464,058 B1 | 6/2013 | Chen et al. |
| 8,464,354 B2 | 6/2013 | Teow et al. |
| 8,533,772 B2 | 9/2013 | Garg et al. |
| 8,543,916 B2 | 9/2013 | Anderson et al. |
| 8,561,152 B2 | 10/2013 | Novak et al. |
| 8,621,561 B2 | 12/2013 | Cross et al. |
| 8,688,813 B2 | 4/2014 | Maes |
| 8,695,075 B2 | 4/2014 | Anderson et al. |
| 8,739,308 B1 | 5/2014 | Roth |
| 8,745,205 B2 | 6/2014 | Anderson et al. |
| 8,776,190 B1 | 7/2014 | Cavage et al. |
| 8,776,204 B2 | 7/2014 | Faynberg et al. |
| 8,868,923 B1 | 10/2014 | Hamlet et al. |
| 8,892,865 B1 | 11/2014 | Roth |
| 2001/0008013 A1 | 7/2001 | Johnson et al. |
| 2001/0018739 A1 | 8/2001 | Anderson et al. |
| 2002/0016840 A1 | 2/2002 | Herzog et al. |
| 2002/0067832 A1 | 6/2002 | Jablon |
| 2002/0095570 A1 | 7/2002 | Eldridge et al. |
| 2002/0112181 A1 | 8/2002 | Smith |
| 2002/0161723 A1 | 10/2002 | Asokan et al. |
| 2002/0161998 A1 | 10/2002 | Cromer et al. |
| 2002/0162019 A1 | 10/2002 | Berry et al. |
| 2002/0174048 A1 | 11/2002 | Dheer et al. |
| 2002/0194483 A1 | 12/2002 | Wenocur et al. |
| 2002/0198848 A1 | 12/2002 | Michener |
| 2003/0016826 A1 | 1/2003 | Asano et al. |
| 2003/0041110 A1 | 2/2003 | Wenocur et al. |
| 2003/0120940 A1 | 6/2003 | Vataja |
| 2003/0135740 A1 | 7/2003 | Talmor et al. |
| 2003/0145197 A1 | 7/2003 | Lee et al. |
| 2003/0145223 A1 | 7/2003 | Brickell et al. |
| 2003/0149781 A1 | 8/2003 | Yared et al. |
| 2003/0188117 A1 | 10/2003 | Yoshino et al. |
| 2003/0196087 A1 | 10/2003 | Stringer et al. |
| 2004/0088260 A1 | 5/2004 | Foster et al. |
| 2004/0103096 A1 | 5/2004 | Larsen |
| 2004/0122958 A1 | 6/2004 | Wardrop |
| 2004/0128505 A1 | 7/2004 | Larsen |
| 2004/0128510 A1 | 7/2004 | Larsen |
| 2004/0131185 A1 | 7/2004 | Kakumer |
| 2004/0143733 A1 | 7/2004 | Ophir et al. |
| 2004/0158734 A1 | 8/2004 | Larsen |
| 2004/0172535 A1 | 9/2004 | Jakobsson et al. |
| 2005/0036611 A1 | 2/2005 | Seaton et al. |
| 2005/0043999 A1 | 2/2005 | Ji et al. |
| 2005/0060580 A1 | 3/2005 | Chebolu et al. |
| 2005/0080914 A1 | 4/2005 | Lerner et al. |
| 2005/0120211 A1* | 6/2005 | Yokoyama ............ G06F 21/335 713/168 |
| 2005/0132192 A1 | 6/2005 | Jeffries et al. |
| 2005/0132215 A1 | 6/2005 | Wang et al. |
| 2005/0166263 A1 | 7/2005 | Nanopoulos et al. |
| 2005/0235148 A1 | 10/2005 | Scheidt et al. |
| 2005/0273862 A1 | 12/2005 | Benaloh et al. |
| 2005/0278547 A1 | 12/2005 | Hyndman et al. |
| 2006/0070116 A1 | 3/2006 | Park |
| 2006/0075462 A1 | 4/2006 | Golan et al. |
| 2006/0094406 A1 | 5/2006 | Cortegiano |
| 2006/0094410 A1 | 5/2006 | Cortegiano |
| 2006/0100928 A1 | 5/2006 | Waleczak, Jr. et al. |
| 2006/0130100 A1 | 6/2006 | Pentland |
| 2006/0149677 A1 | 7/2006 | Shahine et al. |
| 2006/0174125 A1 | 8/2006 | Brookner |
| 2006/0190331 A1 | 8/2006 | Tollinger et al. |
| 2006/0206440 A1 | 9/2006 | Anderson et al. |
| 2006/0206925 A1 | 9/2006 | Dillaway et al. |
| 2006/0218625 A1 | 9/2006 | Pearson et al. |
| 2006/0230284 A1 | 10/2006 | Fiske |
| 2006/0256961 A1 | 11/2006 | Brainard et al. |
| 2006/0271785 A1 | 11/2006 | Holtmanns et al. |
| 2006/0282878 A1 | 12/2006 | Stanley et al. |
| 2007/0005955 A1 | 1/2007 | Pyle et al. |
| 2007/0033396 A1 | 2/2007 | Zhang et al. |
| 2007/0037552 A1 | 2/2007 | Lee et al. |
| 2007/0061571 A1 | 3/2007 | Hammes et al. |
| 2007/0061885 A1 | 3/2007 | Hammes et al. |
| 2007/0136361 A1 | 6/2007 | Lee et al. |
| 2007/0157309 A1 | 7/2007 | Bin et al. |
| 2007/0174614 A1 | 7/2007 | Duane et al. |
| 2007/0186102 A1 | 8/2007 | Ng |
| 2007/0201311 A1 | 8/2007 | Olson |
| 2007/0234410 A1 | 10/2007 | Geller |
| 2007/0250706 A1 | 10/2007 | Oba |
| 2007/0277231 A1 | 11/2007 | Medvinsky et al. |
| 2008/0010665 A1 | 1/2008 | Hinton et al. |
| 2008/0016537 A1 | 1/2008 | Little et al. |
| 2008/0019527 A1* | 1/2008 | Youn ...................... H04L 9/083 380/278 |
| 2008/0040773 A1 | 2/2008 | AlBadarin et al. |
| 2008/0066150 A1 | 3/2008 | Lim |
| 2008/0080718 A1 | 4/2008 | Meijer et al. |
| 2008/0083036 A1 | 4/2008 | Ozzie et al. |
| 2008/0163337 A1 | 7/2008 | Tuliani et al. |
| 2008/0168530 A1 | 7/2008 | Kuehr-McLaren et al. |
| 2008/0182592 A1 | 7/2008 | Cha et al. |
| 2008/0222694 A1 | 9/2008 | Nakae |
| 2008/0301444 A1 | 12/2008 | Kim et al. |
| 2008/0301630 A1 | 12/2008 | Arnold et al. |
| 2008/0313719 A1 | 12/2008 | Kaliski, Jr. et al. |
| 2009/0013402 A1 | 1/2009 | Plesman |
| 2009/0019134 A1 | 1/2009 | Bellifemine et al. |
| 2009/0049518 A1 | 2/2009 | Roman et al. |

(56) References Cited

U.S. PATENT DOCUMENTS

| | | | |
|---|---|---|---|
| 2009/0154705 A1* | 6/2009 | Price, III | H04L 63/06 380/277 |
| 2009/0172793 A1 | 7/2009 | Newstadt et al. | |
| 2009/0199009 A1 | 8/2009 | Chia et al. | |
| 2009/0210712 A1 | 8/2009 | Fort | |
| 2009/0217385 A1 | 8/2009 | Teow et al. | |
| 2009/0254572 A1 | 10/2009 | Redlich et al. | |
| 2009/0254978 A1 | 10/2009 | Rouskov et al. | |
| 2009/0287935 A1 | 11/2009 | Aull et al. | |
| 2009/0320093 A1 | 12/2009 | Glazier et al. | |
| 2010/0017603 A1 | 1/2010 | Jones | |
| 2010/0037304 A1 | 2/2010 | Canning et al. | |
| 2010/0058060 A1 | 3/2010 | Schneider | |
| 2010/0058072 A1 | 3/2010 | Teow et al. | |
| 2010/0071056 A1 | 3/2010 | Cheng | |
| 2010/0083001 A1 | 4/2010 | Shah et al. | |
| 2010/0111296 A1 | 5/2010 | Brown et al. | |
| 2010/0125894 A1 | 5/2010 | Yasrebi et al. | |
| 2010/0131756 A1 | 5/2010 | Schneider | |
| 2010/0142704 A1 | 6/2010 | Camenisch et al. | |
| 2010/0205649 A1 | 8/2010 | Becker et al. | |
| 2010/0239095 A1 | 9/2010 | Carter et al. | |
| 2010/0251347 A1 | 9/2010 | Roskind | |
| 2010/0269156 A1 | 10/2010 | Hohlfeld et al. | |
| 2010/0290476 A1 | 11/2010 | Brindle et al. | |
| 2010/0332845 A1 | 12/2010 | Asaka | |
| 2011/0004753 A1 | 1/2011 | Gomi et al. | |
| 2011/0010538 A1 | 1/2011 | Falk et al. | |
| 2011/0035593 A1 | 2/2011 | Pyle et al. | |
| 2011/0055562 A1 | 3/2011 | Adelman et al. | |
| 2011/0055585 A1 | 3/2011 | Lee | |
| 2011/0078107 A1 | 3/2011 | Almeida et al. | |
| 2011/0083015 A1 | 4/2011 | Meier | |
| 2011/0099362 A1 | 4/2011 | Haga et al. | |
| 2011/0131415 A1 | 6/2011 | Schneider | |
| 2011/0138192 A1 | 6/2011 | Kocher et al. | |
| 2011/0167479 A1 | 7/2011 | Maes | |
| 2011/0176681 A1 | 7/2011 | Yamada et al. | |
| 2011/0179469 A1 | 7/2011 | Blinn et al. | |
| 2011/0213957 A1 | 9/2011 | Tsai et al. | |
| 2011/0231940 A1 | 9/2011 | Perumal et al. | |
| 2011/0239283 A1 | 9/2011 | Chern | |
| 2011/0252229 A1 | 10/2011 | Belenkiy et al. | |
| 2011/0265172 A1 | 10/2011 | Sharma et al. | |
| 2011/0293098 A1 | 12/2011 | Fu et al. | |
| 2011/0296172 A1* | 12/2011 | Fu | H04L 9/0825 713/156 |
| 2011/0296497 A1 | 12/2011 | Becker | |
| 2011/0311055 A1 | 12/2011 | Parann-Nissany | |
| 2011/0320606 A1 | 12/2011 | Madduri et al. | |
| 2012/0017095 A1 | 1/2012 | Blenkhorn et al. | |
| 2012/0020474 A1 | 1/2012 | Kudoh et al. | |
| 2012/0023334 A1 | 1/2012 | Brickell et al. | |
| 2012/0036551 A1 | 2/2012 | Le Saint et al. | |
| 2012/0054625 A1 | 3/2012 | Pugh et al. | |
| 2012/0060035 A1 | 3/2012 | Kalmady et al. | |
| 2012/0106735 A1 | 5/2012 | Fukuda | |
| 2012/0110636 A1 | 5/2012 | Van Biljon et al. | |
| 2012/0144034 A1 | 6/2012 | McCarty | |
| 2012/0159577 A1 | 6/2012 | Belinkiy et al. | |
| 2012/0233216 A1 | 9/2012 | Lim | |
| 2012/0243687 A1 | 9/2012 | Li et al. | |
| 2012/0245978 A1 | 9/2012 | Jain et al. | |
| 2012/0265690 A1 | 10/2012 | Bishop et al. | |
| 2012/0317414 A1 | 12/2012 | Glover | |
| 2013/0031255 A1 | 1/2013 | Maloy et al. | |
| 2013/0086662 A1 | 4/2013 | Roth | |
| 2013/0086663 A1 | 4/2013 | Roth et al. | |
| 2013/0111217 A1 | 5/2013 | Kopasz et al. | |
| 2013/0132232 A1 | 5/2013 | Pestoni et al. | |
| 2013/0145447 A1 | 6/2013 | Maron | |
| 2013/0166918 A1 | 6/2013 | Shahbazi et al. | |
| 2013/0191884 A1 | 7/2013 | Leicher et al. | |
| 2013/0198519 A1 | 8/2013 | Marien | |
| 2013/0254536 A1 | 9/2013 | Glover | |
| 2013/0282461 A1 | 10/2013 | Ovick et al. | |
| 2013/0318630 A1 | 11/2013 | Lam | |
| 2014/0013409 A1 | 1/2014 | Halageri | |
| 2014/0082715 A1 | 3/2014 | Grajek et al. | |
| 2014/0122866 A1 | 5/2014 | Haeger et al. | |
| 2014/0181925 A1 | 6/2014 | Smith | |
| 2014/0208408 A1 | 7/2014 | Bilgen et al. | |
| 2014/0281477 A1 | 9/2014 | Nayshtut et al. | |
| 2014/0281487 A1 | 9/2014 | Klausen et al. | |
| 2015/0082025 A1 | 3/2015 | Deshpande | |
| 2015/0082039 A1 | 3/2015 | Stalzer et al. | |
| 2015/0089614 A1 | 3/2015 | Mathew et al. | |
| 2015/0326692 A1 | 11/2015 | Kaneko et al. | |
| 2015/0381618 A1 | 12/2015 | Lin | |
| 2016/0021076 A1 | 1/2016 | Lin | |
| 2016/0028698 A1* | 1/2016 | Antipa | G06F 21/606 713/150 |

FOREIGN PATENT DOCUMENTS

| | | |
|---|---|---|
| EP | 1104960 | 6/2001 |
| JP | 2003022253 | 1/2003 |
| JP | 2003058657 | 2/2003 |
| JP | 2005500740 | 1/2005 |
| JP | 2007149010 | 11/2005 |
| JP | 2006508471 | 3/2006 |
| JP | 2006120089 | 5/2006 |
| JP | 2006217320 | 8/2006 |
| JP | 2007505542 | 3/2007 |
| JP | 2007206961 | 8/2007 |
| JP | 2007233705 | 9/2007 |
| JP | 2008172728 | 7/2008 |
| JP | 2008228051 | 9/2008 |
| JP | 2011066703 | 3/2011 |
| RU | 2308755 | 10/2007 |
| WO | WO2003065169 | 8/2003 |
| WO | WO2006077822 | 7/2006 |
| WO | WO2008024705 | 2/2008 |
| WO | WO2014063361 | 5/2014 |

OTHER PUBLICATIONS

Chinese Notice to Grant for Application 201710265201.8 dated Jun. 2, 2020, 6 pages.
Singapore Written Opinion and Search Report for Patent Application No. 10201903265P dated May 19, 2020, 10 pages.
Chinese First Office Action for Patent Application No. 201710265201.8 dated Oct. 11, 2019, 10 pages.
Russian Decision to Grant for Patent Application No. 2018137062 dated Sep. 18, 2019, 17 pages.
U.S. Appl. No. 13/248,953, filed Sep. 29, 2011.
U.S. Appl. No. 13/248,962, filed Sep. 29, 2011.
U.S. Appl. No. 13/248,973, filed Sep. 29, 2011.
Australian First Examination Report No. 1 for Patent Application No. 2020200584 dated Nov. 30, 2020, 5 pages.
European Communication Rule 69 for Patent Application No. 20186781.9 dated Nov. 30, 2020, 2 pages.
Brazilian Office Action for Patent Application No. 1220150249066 dated May 5, 2020, 10 pages.
European Communication pursuant to Article 94(3) EPC for Application No. 18200502.5 dated Jan. 24, 2020, 3 pages.
European Rule 71(3) Communication for Patent Application No. 18200502.5 dated Feb. 27, 2020, 75 pages.
Australian Notice of Acceptance for Patent Application No. 2018202251 dated Oct. 21, 2019, 3 pages.
Brazilian Office Action for Patent Application No. BR1120140076650 dated Nov. 19, 2019, 7 pages.
India First Examination Report for Patent Application No. 3111/DELNP/2014 dated Oct. 22, 2019, 5 pages.
Canadian Notice of Allowance for Patent Application No. 2,847,713 dated Aug. 12, 2020, 1 page.
European Extended Search Report for Patent Application No. 20186781.9 dated Sep. 22, 2020, 9 pages.
Japanese Official Notice of Rejection for Patent Application No. 2019-089153 dated Sep. 1, 2020, 4 pages.

(56) References Cited

OTHER PUBLICATIONS

Studer et al., "TACKing Together Efficient Authentication, Revocation, and Privacy in VANETs," Sensor, Mesh and Ad Hoc Communications and Networks, IEEE Jun. 2009, 9 pages.
Amazon, "Amazon Prime Video—security considerations," Amazon. com General Help Forum, http://www.amazon.com/gp/help/customer/forums?ie=UTF8&cdForum=Fx2NFGOONPZEXIP&cdPage=1&cdSort=newest&cdThread=Tx18VZVGGUOY32, latest reply Jun. 17, 2013, 3 pages.
Australian Examination Report No. 2, dated Mar. 26, 2018, for Application No. 2012315674, 3 pages.
Australian First Examination Report No. 1, dated May 28, 2019, for Patent Application No. 2018202251, 3 pages.
Australian Notice of Acceptance dated Apr. 5, 2018, for Patent Application No. 2012315674, filed Sep. 28, 2012, 3 pages.
Berners-Lee et al., "Uniform Resource Identifier (URI): Generic Syntax," Network Working Group Request for Comments: 3986, The Internet Society 2005, retrieved on Nov. 30, 2011, from http://www.ietf.org/rfc/rfc3986.txt.
Borisov, "Active Certificates: A Framework for Delegation," Jan. 1, 2002, retrieved Mar. 15, 2019, from https://nikita.ca/papers/ms-thesis.pdf, 39 pages.
Broadfoot et al., "Architectures for Secure Delegation Within Grids," Jan. 1, 203, retrieved Mar. 15, 2019, from https://www.cs.ox.ac.uk/files/926/RR-03-19.ps, pp. 1-14.
Canadian Office Action for Patent Application No. 2,847,713 dated Jul. 26, 2019, 3 pages.
European Communication Rule 69, dated Jun. 11, 2019, for Patent Application No. 18200502.5, 2 pages.
European Communication under Rule 71(3) EPC for Application No. 12835045.1, Intention to Grant, dated Apr. 25, 2018, 80 pages.
European Supplemental Search Report for Patent Application No. EP18200502, dated Mar. 25, 2019, 11 pages.
Garay et al., "Timed Release of Standard Digital Signatures," Financial Cryptography, Mar. 11, 2002 [lecture notes in computer science], Springer Berlin Heidelberg, pp. 168-182.
Ghorbei-Talbi et al., "Managing Delegation in Access Control Models," International Conference on Advanced Computing and Communications, pp. 744-751, Dec. 18-21, 2007.
Google, "Encrypting Disks with Customer-Supplied Encryption Keys," last updated Jun. 21, 2017, retrieved from internet on Jun. 30, 2017, from https://cloud.google.com/compute/docs/disks/customer-supplied-encryption, 15 pages.
International Search Report and Written Opinion dated Dec. 30, 2014, in International Patent Application No. PCT/US2014/057043, filed Sep. 23, 2014.
International Search Report and Written Opinion dated Dec. 30, 2014, in International Patent Application No. PCT/US2014/057051, filed Sep. 23, 2014.
International Search Report and Written Opinion dated Oct. 22, 2014, International Patent Application No. PCT/US2014/042569, filed Jun. 16, 2014.
Japanese Notice of Allowance, dated Mar. 12, 2019, for Patent Application No. 2017-007876, 15 pages.
Japanese Notice of Rejection, dated Oct. 2, 2018, for Patent Application No. 2017-007876, 7 pages.
Japanese Official Notice of Final Rejection, dated Dec. 5, 2017, for Patent Application No. 2017-007876, 10 pages.
Kiyomoto et al., "Design of Self-Delegation for Mobile Terminals," Information and Media Technologies 1(1):594-605 2006, reprinted from IPSJ Digital Courier 1:282-293 (2005).
Krawczyk et al., "HMAC: Keyed-Hashing for Message Authentication," Internet Engineering Task Force (IETF) Request for Comments: 2104, Feb. 1997, retrieved Jan. 22, 2015, from https://tols.ietf.org/html/rfc2104, pp. 1-11.

Liscano et al., "A Context-based Delegation Access Control Model for Pervasive Computing," 21st International Conference on Advanced Information Networking and Applications Workshops 2:44-51, May 21-23, 2007.
Massachusetts Institute of Technology, "Kerberos V5 Installation Guide [online]," May 2012, retrieved on Jun. 27, 2012, from http://web.mit.edu/kerberos/krb5-1.10/krb5-1.10.2/doc/krb5-install.htm, 65 pages.
Massachusetts Institute of Technology, "Kerberos V5 System Administrator's Guide [online]," May 2012, retrieved on Jun. 27, 2012, from http://web.mit.edu/kerberos/krb5-1.10/krb5-1.10.2/doc/krb5-admin.html, 57 pages.
Massachusetts Institute of Technology, "Kerberos V5 Unix User's Guide," May 2012, retrieved on Jun. 28, 2012, from http://web.mit.edu/kerberos/krb5-1.10/krb5-1.10.2/doc/krb5-user.html, 38 pages.
Patent Cooperation Treaty, "Notification of Transmittal of the International Search Report and the Written Opinion of the International Searching Authority, or the Declaration," issued to International Application No. PCT/US2012/058083 dated Dec. 27, 2012.
Pearlman et al., "A Community Authorization Service for Group Collaboration," Proceedings of International Workshop on Policies for Distributed Systems, Jun. 5, 2002, pp. 50-59.
Roth et al., "Hierarchical Data Access Techniques," U.S. Appl. No. 13/431,882, filed Mar. 27, 2012.
Russian Decision on Grant dated Aug. 15, 2018, for Patent Application No. 2017135822, 23 pages.
Russian Decision to Grant, dated Aug. 29, 2018, for Patent Application No. 2017135821, 24 pages.
Russian Office Action, dated Jun. 10, 2019, for Patent Application No. 2018137062, 8 pages.
Russian Search Report accompanying Office Action, dated Jun. 10, 2019, for Patent Application No. 2018137062, 4 pages.
Simpson, "PPP Challenge Handshake Authentication Protocol (CHAP)," Network Working Group, Aug. 1996, retrieved from internet Jun. 27, 2012, http://etherpad.tools.ietf.org/html/rfc1994, 13 pages.
Singapore Examination Report dated Feb. 13, 2019, for Patent Application No. 102016080670, 4 pages.
Singapore Search Report and Written Opinion, dated Apr. 30, 2018, for Patent Application No. 10201608067Q filed Sep. 28, 2012, 14 pages.
TCG Published, "TPM Main Part 1 Design Principles," Specification Version 1.2, Revision 116, Mar. 1, 2011, 184 pages.
TCG Published, "TPM Main Part 2 TPM Structures," Specification Version 1.2, Level 2 Revision 116, Mar. 1, 2011, 202 pages.
TCG Published, "TPM Main Part 3 Commands," Specification Version 1.2, Level 2 Revision 116, Mar. 1, 2011, 339 pages.
U.S. Appl. No. 13/431,760, filed Mar. 27, 2012.
U.S. Appl. No. 13/431,898, filed Mar. 27, 2012.
Wang et al., "Extending the Security Assertion Markup Language to Support Delegation for Web Services and Grid Services," IEEE International Conference on Web Services 1:67-74, Jul. 11-15, 2005.
Wikipedia, "Physical unclonable function," retrieved Aug. 22, 2013, from http://en.wikipedia.org/wiki/Physical_unclonable_function, 8 pages.
Japanese Notice of Allowance for Patent Application No. 2019-089153 dated Apr. 6, 2021, 6 pages.
Singapore Written Opinion for Patent Application No. 2019-089153 dated Feb. 25, 2021, 6 pages.
Brazilian Office Action for Patent Application No. 1220150249066 dated May 11, 2021, 7 pages.
Brazilian Notice of Allowance for Patent Application No. BR1120140076650 dated May 4, 2021, 6 pages.
Brazilian Notice of Allowance with Examination Report for Patent Application No. 1220150249066 dated Aug. 24, 2021, 8 pages.

* cited by examiner

CRYPTOGRAPHIC KEY MANAGEMENT FOR IMPORTED CRYPTOGRAPHIC KEYS

CROSS REFERENCE TO RELATED APPLICATIONS

This application is a continuation of U.S. patent application Ser. No. 15/239,725, filed Aug. 17, 2016, entitled "CRYPTOGRAPHIC KEY MANAGEMENT FOR IMPORTED CRYPTOGRAPHIC KEYS," which claims the benefit of U.S. Patent Application No. 62/372,686, filed Aug. 9, 2016, entitled "CRYPTOGRAPHIC KEY MANAGEMENT FOR IMPORTED CRYPTOGRAPHIC KEYS," the disclosures of which are incorporated by reference herein for all purposes. This application further incorporates by reference for all purposes the full disclosure of U.S. patent application Ser. No. 13/248,962, filed on Sep. 29, 2011, now U.S. Pat. No. 9,178,701, entitled "PARAMETER BASED KEY DERIVATION."

BACKGROUND

Customers of a computing resource service provider or other service providers often store sensitive information using a variety of services provided by these service providers. To ensure the security of this sensitive information, the customers of these service providers often use cryptographic keys to encrypt the sensitive information. The cryptographic keys may be managed by these service providers, which may control access to the cryptographic keys and enable authorized users to access these cryptographic keys. However, some customers of these service providers may want to import their own cryptographic keys, which can be used to ensure the security of their sensitive information. Enabling customers to provide their own cryptographic keys is complex and may require extensive use of resources to manage while ensuring the security of these provided cryptographic keys.

BRIEF DESCRIPTION OF THE DRAWINGS

Various techniques will be described with reference to the drawings, in which.

DETAILED DESCRIPTION

Figure 1:
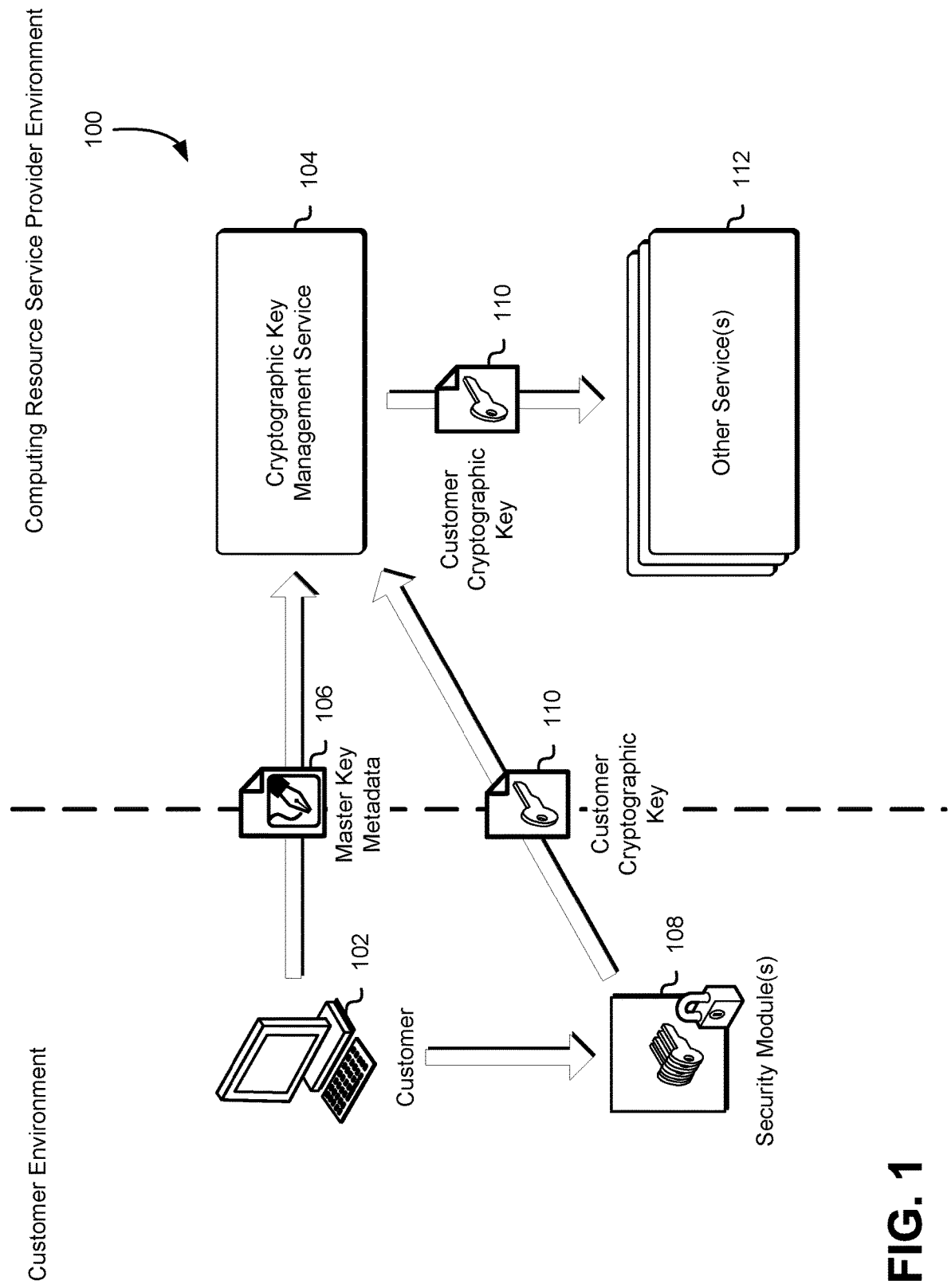
FIG. 1 shows an illustrative example of an environment in which various embodiments can be implemented.

This disclosure relates to enabling customers of a cryptographic key management service to import cryptographic keys that can be used to encrypt data and to decrypt data that is protected using these imported cryptographic keys. In an example, a customer of the cryptographic key management service transmits a request to the cryptographic key management service to enable the customer to import a new cryptographic key. In the request, the customer may provide metadata associated with the cryptographic key that is to be imported. For instance, the customer may specify a variety of access policies for the cryptographic key, which may be used by the cryptographic key management service to control access to the cryptographic key that is to be imported by the customer. Additionally, the metadata associated with the cryptographic key may specify the description of the cryptographic key that is to be imported, an alias for the cryptographic key, and the like. The metadata for the cryptographic key may be used to identify the cryptographic key once it has been imported to the cryptographic key management service.

In response to the request from the customer to import a new cryptographic key, the cryptographic key management service may generate a cryptographic key pair that can be used by the customer to import its new cryptographic key pair. In an example, the cryptographic key management service uses a domain cryptographic key maintained by the service to encrypt the private cryptographic key of the newly generated cryptographic key pair to create an import key token that may be provided to the customer. The cryptographic key management service may serialize the import key token with an expiration date in order to limit the amount of time available to the customer to provide its cryptographic key for import. The cryptographic key management service may provide this import key token, along with the public cryptographic key of the cryptographic key pair, to the customer to enable the customer to import its cryptographic key. In response to receiving the public cryptographic key and the import key token from the cryptographic key management service, the customer may use the public cryptographic key to encrypt the cryptographic key that is to be imported. The customer may provide the encrypted cryptographic key and the import key token to the cryptographic key management service to import the customer's cryptographic key.

In some examples, the cryptographic key management service, in response to receiving the encrypted cryptographic key and the import key token from the customer, will determine if the import key token has expired. If the import key token has expired, the cryptographic key management service may reject the encrypted cryptographic key provided by the customer. However, if the import key token has not expired, the cryptographic key management service may use its domain cryptographic key to decrypt the import key token to obtain the private cryptographic key generated by the service. The cryptographic key management service may use the private cryptographic key to decrypt the imported cryptographic key from the customer. Using information specified by the customer in its request, the cryptographic key management service may set the expiration date for the imported cryptographic key. Further, the cryptographic key management service may encrypt the imported cryptographic key using the domain cryptographic key of the service to produce an encrypted key token. This encrypted key token is associated with the metadata provided by the customer in its request. Additionally, the cryptographic key management service may store the expiration date for the encrypted key token to the metadata or to the encrypted key token itself.

Users of the imported cryptographic key may submit requests to the cryptographic key management service to perform a cryptographic operation using the imported cryptographic key. The requests may include an identifier of the imported cryptographic key, which may be provided to the customer as a result of the importation of the cryptographic key and which the cryptographic key management service may use to identify the imported cryptographic key. The cryptographic key management service may determine whether the imported cryptographic key has expired. If the imported cryptographic key has expired, the cryptographic key management service may deny the request. Alternatively, if the imported cryptographic key is still active, the cryptographic key management service may enable use of the imported cryptographic key for the requested cryptographic operation, subject to any policies or grants that may be applicable to the request and to the user that submitted the request.

In this manner, a customer of a cryptographic key management service can securely import a cryptographic key for use in cryptographic operations. In addition, the techniques described and suggested in this disclosure enable additional technical advantages. For instance, because the private cryptographic key is encrypted using the cryptographic key management service's domain cryptographic key, the private cryptographic key is made inaccessible to the customer and to any other entity that obtains the import key token from the cryptographic key management service. Thus, as a result of the customer encrypting the cryptographic key that is to be imported into the service, no entity other than the cryptographic key management service may be able to obtain the customer's cryptographic key as the cryptographic key management service is the only entity that has the domain cryptographic key necessary to obtain the private cryptographic key from the import key token that can be used to decrypt the customer's cryptographic key.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a customer, through a client device 102, may transmit a request to a cryptographic key management service 104 to import a customer cryptographic key 110 that can be used by the customer and other users for various cryptographic operations. The cryptographic operations may include use of the customer cryptographic key 110 to decrypt data stored within one or more services 112 of a computing resource service provider. The cryptographic key management service 104 may include one or more computer systems that are used to create, manage, and control cryptographic keys that can be used to encrypt and decrypt data maintained by other computing resource services 112. For instance, a customer of a computing resource service provider may transmit a request to the cryptographic key management service 104 to utilize an imported customer cryptographic key 110 to encrypt the customer's data stored within various computing resource services 112 provided by a computing resource service provider. Alternatively, the customer may transmit a request to the cryptographic key management service 104 to decrypt the customer's data through use of the customer cryptographic key 110 imported by the customer.

In an embodiment, the request to import a customer cryptographic key 110 includes master key metadata 106 for a customer master key. The customer master key is a logical construct that may be used to protect any cryptographic keys associated with the customer master key. The customer master key may initially have no associated cryptographic key and may not be used for any operations if a customer cryptographic key 110 has not been imported and an encrypted key token created based at least in part on the customer cryptographic key 110. The master key metadata 106 for the customer master key may specify an alias for the customer master key, any access control policies or grants for the customer master key, and the like. For instance, the master key metadata 106 may specify one or more grants that can be used to regulate access to the customer cryptographic keys imported to the cryptographic key management service 104. A grant may specify an entity that is the principal of the grant, such as an identifier of a user, a group of users, a role that may be assumed by users, and the like that may have permission to utilize a customer cryptographic key 110. The grant may further specify identifiers for principals that may have permission to retire the grant. Additionally, the grant may identify the customer cryptographic key to which the grant applies. The cryptographic key management service 104 may generate, in response to receiving the master key metadata 106 from the customer, a customer master key. The cryptographic key management service 104 may store the customer master key for the customer in an account profile datastore, where the customer master key may be associated with the customer's account profile.

If the customer has provided the master key metadata 106 for a customer master key to the cryptographic key management service 104, the customer may submit a request to the cryptographic key management service 104 to import a customer cryptographic key 110 into the customer master key. The request may specify the cryptographic algorithm used for the customer cryptographic key 110, such as the Advanced Encryption Standard (AES) or any of the Secure Hash Algorithm (SHA) cryptographic algorithms (e.g., SHA-1, SHA-2, SHA-3, etc.). Additionally, the customer may specify the key size for the customer cryptographic key 110 (e.g., 128-bit, 256-bit, etc.) subject to the selected cryptographic algorithm. In response to the customer request to import the customer cryptographic key 110, the cryptographic key management service 104 may generate a cryptographic key pair using one or more public cryptographic key cryptosystems, such as a Rivest-Shamir-Adleman (RSA) algorithm. In some embodiments, the customer can specify the one or more public cryptographic key cryptosystems (e.g., RSA, elliptic curve algorithms, Diffie-Hellman algorithms, etc.) that the cryptographic key management service 104 can use to generate the cryptographic key pair. While public cryptographic key cryptosystems are used extensively throughout the present disclosure for the purpose of illustration, other cryptographic algorithms may be used by the cryptographic key management service 104 to generate the cryptographic key pair, such as elliptic curve cryptography. It should be noted that the request to import the customer cryptographic key 110 may also include instructions for generating the customer master key, to which the customer cryptographic key 110 is to be added.

The cryptographic key management service 104 may serialize the private cryptographic key of the newly generated cryptographic key pair with an expiration date based at least in part on the validity period for the cryptographic key pair. If the private cryptographic key is serialized with the expiration date successfully, the cryptographic key management service 104 may utilize a domain cryptographic key to encrypt the serialized private cryptographic key, resulting in an import key token for the customer cryptographic key 110 that is to be imported to the cryptographic key management service 104. The cryptographic key management service 104 may transmit, in response to the customer request, the import key token and the public cryptographic key to the customer client device 102 to enable the customer to import its customer cryptographic key 110.

In some examples, "serializing" may refer to the use of additional authenticated data (AAD) in the encryption process for the private cryptographic key. For instance, the import key token may include the encrypted private cryptographic key, a message authentication code (MAC), and the AAD. In some instances, the expiration date for the private cryptographic key may be placed on encryption contexts, where encrypted data can be cryptographically bound to aspects of the encryption contexts. As an illustrative example, the AAD can be used to cryptographically bind the expiration date on the private cryptographic key. The AAD may be used to ensure that entities cannot change the expiration date for the private cryptographic key without affecting the MAC that results from the encryption process. The AAD may be cryptographically bound to the import key token by way of the MAC resulting from an authenticated encryption mode of a cipher, such as AES-GCM.

In some embodiments, the customer maintains one or more security modules 108 that may be used to generate and maintain the customer's cryptographic keys. A security module 108 is a physical computing device or other computing device of the customer that is used to manage cryptographic keys on behalf of the customer of the computing resource service provider. For instance, the customer may use the security module 108 to provision a new cryptographic key for encrypting the customer's data, which may be imported to the cryptographic key management service 104. The security module 108 can be a hardware security module (HSM), which can include a plug-in device for a customer client device 102 or an external device that attaches to the client device 102. The HSM may utilize various mechanisms to provide tampering resistance and may provide notifications to the customer if an attempt to tamper with a cryptographic key is detected. Other security appliances that are not classified as hardware security modules may be used as the security module 108 to protect the cryptographic keys stored therein.

In response to receiving the import key token and the public cryptographic key from the cryptographic key management service 104, the customer may utilize the public cryptographic key to encrypt the customer cryptographic key 110 that is to be imported to the cryptographic key management service 104. If the customer maintains a security module 108 that is used to generate and manage the customer cryptographic key 110, the customer may provide the received import key token and the public cryptographic key to the security module 108 for its use. This may cause the security module 108 to use the public cryptographic key to encrypt the customer cryptographic key maintained on behalf of the customer. The customer may also identify an expiration date for the customer cryptographic key 110, which may be used by the cryptographic key management service 104 to determine a time at which the customer cryptographic key 110 is no longer usable for cryptographic operations.

The customer, either through the client device 102 or the security module 108, may transmit the encrypted customer cryptographic key and the import key token to the cryptographic key management service 104 to implement the customer cryptographic key 110. In response to receiving the encrypted customer cryptographic key and the import key token, the cryptographic key management service 104 may evaluate the import key token to determine whether it has expired. As described above, the cryptographic key management service 104 may serialize the private cryptographic key with an expiration date that is based at least in part on the validity period for the private cryptographic key. If the import key token has expired, the cryptographic key management service 104 may reject the encrypted customer cryptographic key. However, if the import key token has not expired, the cryptographic key management service 104 may utilize the domain cryptographic key to decrypt the import key token to obtain the private cryptographic key. This private cryptographic key may be used by the cryptographic key management service 104 to decrypt the encrypted customer cryptographic key provided by the customer.

The cryptographic key management service 104 may utilize the customer cryptographic key 110 to produce an encrypted key token that may be associated with the customer master key. For instance, the cryptographic key management service 104 may set the expiration date for the customer cryptographic key 110 based at least in part on the expiration date provided by the customer in its request to import a cryptographic key. The cryptographic key management service 104 may use the domain cryptographic key to encrypt the customer cryptographic key 110 to produce the encrypted key token. This encrypted key token may be persisted in a token datastore of the cryptographic key management service 104 for use in response to requests to perform cryptographic operations using the customer cryptographic key 110. The expiration date for the customer cryptographic key 110 may be stored within the metadata for the customer master key. Thus, the cryptographic key management service 104 may associate the customer master key with the imported customer cryptographic key 110. The cryptographic key management service 104 may transmit a notification to the customer indicating that the association between the customer cryptographic key and the customer master key has been made.

The customer and other authorized users may submit requests to the cryptographic key management service 104 to perform cryptographic operations using the customer cryptographic key 110. For instance, a customer or other authorized user may submit a request to the cryptographic key management service 104 that includes an identifier for the customer master key to enable performance of a cryptographic operation using the customer cryptographic key 110 associated with the customer master key. In response to such a request, the cryptographic key management service 104 may determine whether the customer cryptographic key 110 has expired. For instance, in response to a request to utilize the customer cryptographic key 110 to perform a cryptographic operation, the cryptographic key management service 104 may derive, from the customer cryptographic key 110, one or more cryptographic keys for the purpose of performing the requested cryptographic operation. If the customer cryptographic key 110 has expired, use of the customer cryptographic key 110 is blocked resulting in the rejection of the request. The customer master key with associated metadata may still be available, which may allow customers to reimport the customer cryptographic key 110 under the same customer master key identifier to restore functionality for the customer master key.

In an embodiment, if a customer cryptographic key 110 has expired, the cryptographic key management service 104 transmits a notification to the customer. The cryptographic key management service 104, through a computing resource monitoring service, may generate metrics based at least in part on usage and characteristics of the imported cryptographic keys. Customers may access the computing resource monitoring service to set custom thresholds for alarms and publish alarm notifications. Thus, as a customer cryptographic key 110 approaches an expiration date for the key, the customer may be notified of the approaching expiration date and take appropriate action (e.g., extend the expiration date for the customer cryptographic key 110, etc.).

If the customer cryptographic key 110 has not expired, use of the customer cryptographic key 110 may be permitted subject to any applicable grants and policies. For instance, the cryptographic key management service 104 may obtain the customer cryptographic key 110 and use the customer cryptographic key 110 to perform the cryptographic operation specified by the customer or other authorized user to fulfill the request. For example, the cryptographic key management service 104 may access the one or more other services 112 on behalf of the customer or other authorized user and utilize the customer cryptographic key 110 to decrypt data from the one or more other services 112 as specified in the request from the customer or other authorized user. The cryptographic key management service 104 may provide the decrypted data to the customer or other authorized user to fulfill the request.

Figure 2:
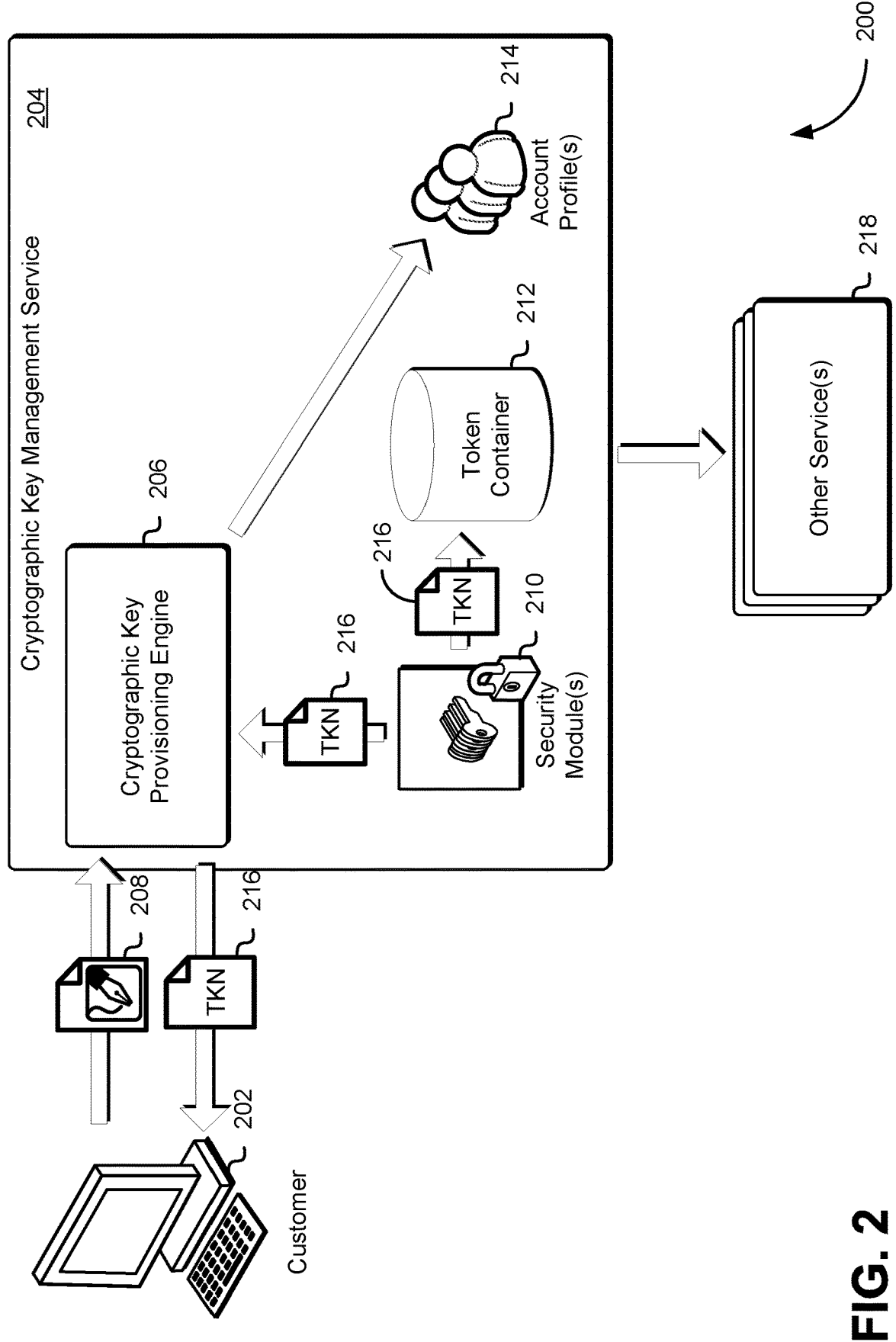
FIG. 2 shows an illustrative example of an environment in which a cryptographic key management service generates an import key token to be used for importing a customer cryptographic key in accordance with at least one embodiment.

As noted above, a customer of a computing resource service provider may transmit a request to a cryptographic key management service to import a customer cryptographic key that may be used to perform various cryptographic operations. To ensure that the customer cryptographic key is imported securely, the cryptographic key management service may provide an import key token and a public cryptographic key of a cryptographic key pair to enable the customer to encrypt the customer cryptographic key and to provide the encrypted customer cryptographic key to the cryptographic key management service. Accordingly, FIG. 2 shows an illustrative example of an environment 200 in which a cryptographic key management service 204 generates an import key token 216 to be used for importing a customer cryptographic key in accordance with at least one embodiment.

In the environment 200, a customer, through a client device 202, transmits a request to a cryptographic key management service 204 to import a customer cryptographic key that is to be associated with a particular customer master key. The customer cryptographic key may be used to perform cryptographic operations, which may include use of the customer cryptographic key to decrypt data stored within one or more services 218 of a computing resource service provider or to encrypt data stored within these one or more services 218. In the request, the customer may provide metadata 208 for the customer master key, which may be used to regulate use of the customer master key and to establish the association with the customer cryptographic key that is to be imported. For example, the metadata 208 provided by the customer may include policies and grants that may be used to control access to the customer cryptographic key associated with the customer master key. Additionally, the metadata 208 may specify one or more identifiers or aliases for the customer master key and the customer cryptographic key that is to be imported to the cryptographic key management service 204.

In an embodiment, the cryptographic key management service 204 includes a cryptographic key provisioning engine 206, which may process the incoming metadata 208 from the customer, as well as the request to import a customer cryptographic key. The cryptographic key provisioning engine 206 may include one or more computer systems of the cryptographic key management service 204 or an application installed on a computer system of the cryptographic key management service 204 that processes incoming requests to utilize cryptographic keys and enables use of the cryptographic keys for performance of cryptographic operations. The cryptographic key provisioning engine 206 may also process incoming requests to import customer cryptographic keys and to manage any of these customer cryptographic keys on behalf of a customer or other authorized users.

In response to receiving the metadata 208 from the customer client device 202 for the customer master key, the cryptographic key provisioning engine 206 may access the account profile datastore 214 to modify the customer's account profile and store the obtained metadata 208. Through the customer's account profile, the cryptographic key provisioning engine 206 may update information regarding the customer master key, such as the expiration date for the customer master key, policies or grants applicable to the customer master key or the customer cryptographic key that is to be imported, and the like.

In addition to accessing the customer's account profile to update the account profile based at least in part on the provided metadata 208, the cryptographic key provisioning engine 206 may transmit a request to a security module 210 of the cryptographic key management service 204 to generate a cryptographic key pair that may be used for the importation of the customer cryptographic key. Similar to the security module 108 described above in connection with FIG. 1, the security module 210 is a physical computing device or other computing device of the cryptographic key management service 204 that is used to manage cryptographic keys on behalf of customers of the computing resource service provider. For instance, in response to a request from a customer to provision a new cryptographic key for encrypting the customer's data, the cryptographic key management service 204 may generate the cryptographic key and store the cryptographic key within the security module 210. The security module 210 can be an HSM, which can include a plug-in device for a cryptographic key management service 204 computer system or an external device that attaches to the computer system. The HSM may utilize various mechanisms to provide tampering resistance and may provide notifications to the cryptographic key management service 204 if an attempt to tamper with a cryptographic key is detected. Other security appliances that are not classified as hardware security modules may be used as the security module 210 to protect the cryptographic keys stored therein. Any cryptographic keys stored in the security module 210 are not accessible by the customer or any other users of the cryptographic key management service 204.

In response to the request from the cryptographic key provisioning engine 206, the security module 210 may generate a cryptographic key pair that can be used to encrypt the customer cryptographic key that is to be imported by the customer. The cryptographic key pair may be created using one or more public cryptographic key cryptosystems, such as RSA or any other asymmetric cryptographic key algorithm (e.g., elliptic curve cryptography, etc.). The cryptographic key pair may be generated in order to facilitate importation of the customer cryptographic key into the identified customer master key, as specified in the provided metadata 208. The private cryptographic key of the cryptographic key pair may be serialized with an expiration date determined based at least in part on the validity period for the cryptographic key pair.

The security module 210 may use a domain cryptographic key maintained by the cryptographic key management service 204 to encrypt the private cryptographic key and the expiration date, resulting in an import key token 216. In an embodiment, the security module 210 stores the import key token 216 in a token container 212 of the cryptographic key management service 204. The security module 210 may retrieve the import key token 216 from the token container 212 in response to receiving the encrypted customer cryptographic key from the customer, as will be described in greater detail below. The security module 210 may transmit the import key token 216 and the public cryptographic key of the cryptographic key pair to the cryptographic key provisioning engine 206. In response to receiving the import key token 216 and the public cryptographic key from the security module 210, the cryptographic key provisioning engine 206 may transmit the import key token 216 and the public cryptographic key to the customer, through its client device 202.

Figure 3:
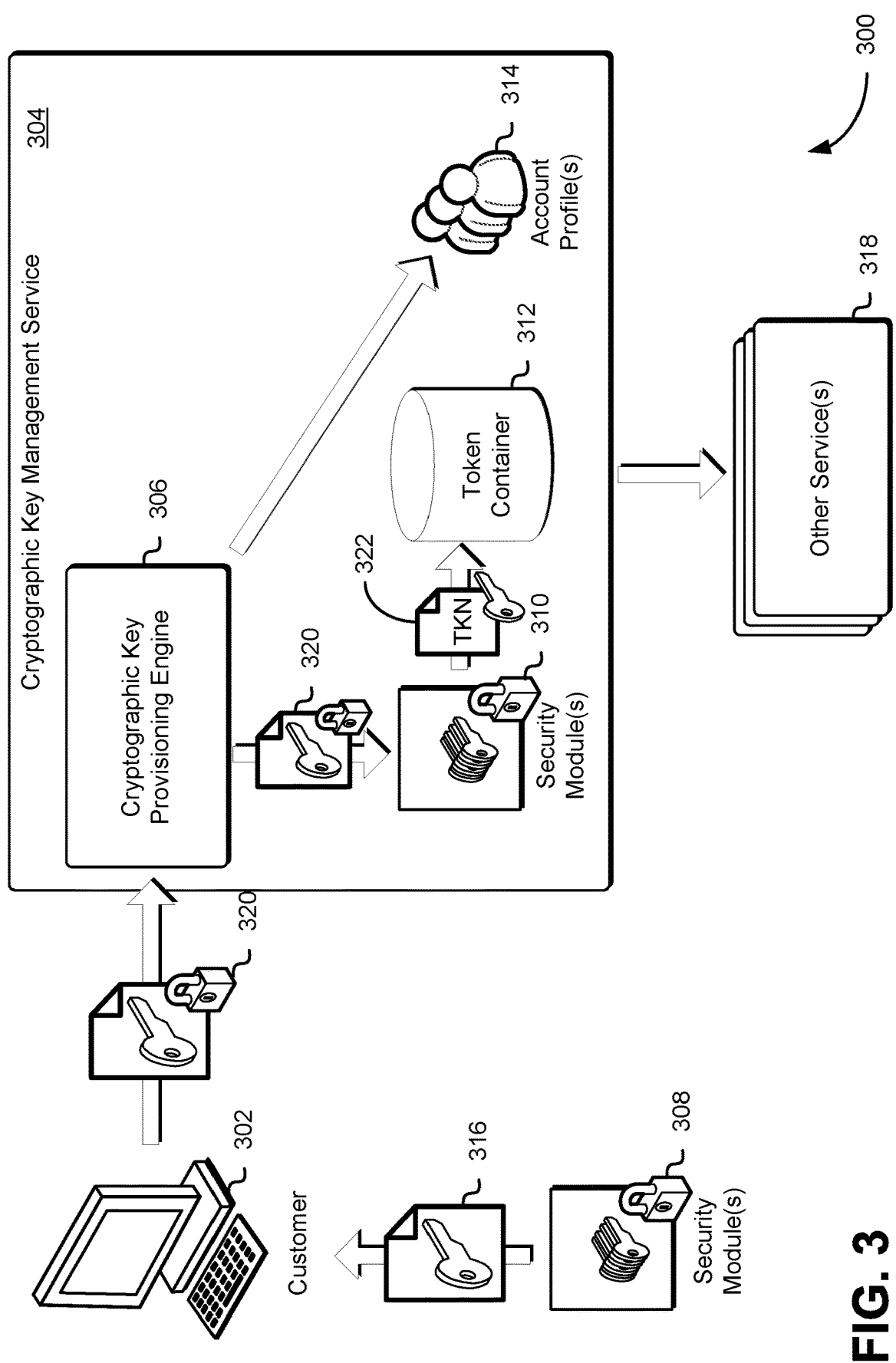
FIG. 3 shows an illustrative example of an environment in which a cryptographic key management service obtains a customer cryptographic key to be used for cryptographic operations in accordance with at least one embodiment.

FIG. 3 shows an illustrative example of an environment 300 in which a cryptographic key management service 304 obtains a customer cryptographic key 316 to be used for cryptographic operations in accordance with at least one embodiment. In the environment 300, the customer, through its client device 302, may receive the import key token and the public cryptographic key generated by the security module 310, as described above in connection with FIG. 2. In response to receiving the import key token and the public cryptographic key from the cryptographic key provisioning engine 306, the customer, through its client device 302, may utilize the public cryptographic key to encrypt the customer cryptographic key 316 that is to be imported to the cryptographic key management service 304, resulting in an encrypted customer cryptographic key 320.

In some embodiments, the customer maintains a security module 308 that is used to generate and maintain the customer cryptographic keys used by the customer. If the customer maintains a security module 308 for its customer cryptographic keys, the customer may transmit the received import key token and the public cryptographic key to the security module 308 for encryption of the desired customer cryptographic key 316. The security module 308 may use the public cryptographic key to encrypt the desired customer cryptographic key 316 and provide the encrypted customer cryptographic key 320 to the customer. Alternatively, the security module 308 may provide the desired customer cryptographic key 316 to the customer. The customer, through its client device 302 may use the public cryptographic key to encrypt the customer cryptographic key 316 to create the encrypted customer cryptographic key 320.

The customer, through its client device 302, may transmit the encrypted customer cryptographic key 320 and the import key token to the cryptographic key management service 304. In response to receiving the encrypted customer cryptographic key 320 and the import key token, the cryptographic key provisioning engine 306 may transmit the encrypted customer cryptographic key 320 and the import key token to the security module 310 for processing. In some embodiments, the security module 310 uses an identifier of the import security token to determine an expiration date for the private cryptographic key included in the import security token. For instance, the security module 310 may maintain a table comprising key-value pairs for any created import key tokens. The security module 310 may use the identifier of the import key token to find a corresponding value in the table that can be used to determine the expiration date for the private cryptographic key. In an alternative embodiment, the security module 310 uses the domain cryptographic key to decrypt the import key token and obtain the expiration date for the private cryptographic key.

In some embodiments, the security module 310 encodes one or more restrictions, including an expiration date for the private cryptographic key into the ciphertext of the import key token. For instance, the security module 310 may encode certain restrictions, such as limitations on geographic regions from which the import key token may be received, limitations on the computing resource services for which the import key token may be used, and the like. If the customer provides the import key token along with the encrypted customer cryptographic key 320, the security module 310 may hash the import key token with one or more reference variables to determine whether the import key token satisfies the one or more restrictions imposed by the security module 310. If the one or more restrictions are met, the import key token may be deemed valid. Otherwise, the import key token may be deemed invalid and rejected. A more detailed description of these techniques is described in U.S. Pat. No. 9,178,701, entitled "Parameter Based Key Derivation," which is hereby incorporated in its entirety by reference.

In an embodiment, the security module 310 hashes the provided customer cryptographic key and uses the resulting hash to determine whether the customer cryptographic key satisfies one or more restrictions imposed by the security module 310 and the customer. For instance, a customer master key may be associated with a single customer cryptographic key. If the customer cryptographic key expires, the customer may submit a request to re-import the customer cryptographic key for the customer master key. The security module 310 may retain a hash of the expired customer cryptographic key, which it may compare to the resulting hash of the provided customer cryptographic key to determine whether there is a match. If there is a match, the customer cryptographic key may be associated with the customer master key, as will be described in greater detail below. However, if the hashes do not match, the provided customer cryptographic key may be different from the expired customer cryptographic key. As a result, the security module 310 may reject the provided customer cryptographic key as it may not be used with the specified customer master key. If the customer is providing a customer cryptographic key for the first time, the security module 310 may retain the hash of the provided customer cryptographic key in association with the customer master key for reference.

If the import key token has expired (e.g., the expiration date has passed for the private cryptographic key), the security module 310 may reject the encrypted customer cryptographic key 320. Further, the security module 310 may transmit a notification to the cryptographic key provisioning engine 306 to indicate that the encrypted customer cryptographic key 320 has been rejected. The cryptographic key provisioning engine 306 may notify the customer that its request to import a customer cryptographic key has been denied. In some instances, if the import key token has expired, the security module 310 may generate a new cryptographic key pair and utilize the new private cryptographic key of this pair to generate a new import key token. This import key token and the newly generated public cryptographic key may be provided to the customer to enable the customer to provide the customer cryptographic key, encrypted using the new public cryptographic key.

If the import key token has not expired, the security module 310 may use the domain cryptographic key to decrypt the import key token and obtain the private cryptographic key of the cryptographic key pair. If the import key token was originally stored within the token container 312, the security module 310 may retrieve import key token from the token container 312. The security module 310 may utilize the private cryptographic key from the import key token to decrypt the encrypted customer cryptographic key 320 to obtain the customer cryptographic key 316. The security module 310 may encrypt the customer cryptographic key 316 using the domain cryptographic key to produce an encrypted key token 322. The encrypted key token 322 may be provided with an expiration date based at least in part on an expiration date provided by the customer in its request to import the customer cryptographic key 316.

The security module 310 may transmit the encrypted key token 322 to the token container 312. Additionally, the security module 310 may update the metadata for the customer master key to indicate the expiration date of the encrypted key token 322. The security module 310 may further cause the cryptographic key provisioning engine 306 to access the customer account profile in the account profile datastore 314 to indicate the expiration date of the encrypted key token 322. Thus, based on the customer's account profile settings, the cryptographic key provisioning engine 306 may notify the customer if the encrypted key token 322 is about to expire or has expired.

If the cryptographic key management service 304 receives a request to utilize a customer cryptographic key to perform a cryptographic operation, the cryptographic key management service 304 may determine whether the encrypted key token 322 that includes the customer cryptographic key has expired. If the encrypted key token 322 has expired, the cryptographic key management service 304 may deny the request to perform the cryptographic operation. However, if the encrypted key token 322 has not expired, the cryptographic key management service 304 may use the security module 310 to obtain the encrypted key token 322, use the domain cryptographic key to decrypt the encrypted key token 322 to obtain the customer cryptographic key, and use the customer cryptographic key to perform the requested cryptographic operation, which may include encryption or decryption of data provided by other computing resource services 318.

In an embodiment, if the encrypted key token 322 expires, the encrypted key token 322 is removed from the token container 312 and is blocked by the security module 310 such that any requests to utilize the encrypted key token 322 are denied. However, the customer master key and the associated metadata may remain and may be unaffected by the expiration of the encrypted key token 322. This may allow the customer to reimport its customer cryptographic key 316 under the same customer master key identifier to restore functionality for the customer master key. For instance, if customer data was previous encrypted using the customer cryptographic key 316 but the associated encrypted key token 322 has expired, the customer may import the customer cryptographic key 316 to the cryptographic key management service 304 to generate a new encrypted key token 322 that is associated with the customer master key. Thus, the customer may submit a request to perform a cryptographic operation using the customer cryptographic key that may be fulfilled.

Figure 4:
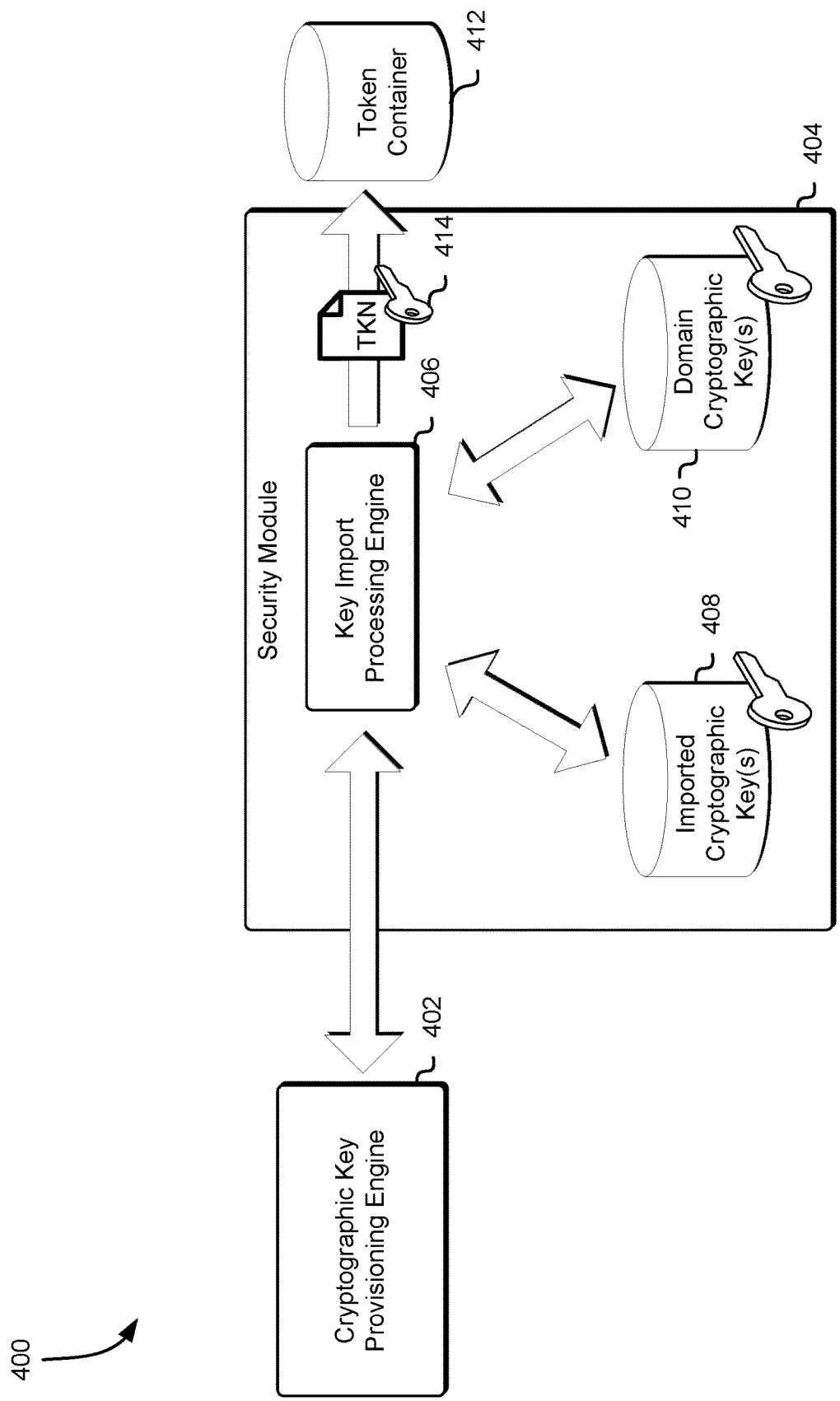
FIG. 4 shows an illustrative example of an environment in which a security module of a cryptographic key management service stores imported customer cryptographic keys for use in cryptographic operations in accordance with at least one embodiment.

As noted above, the cryptographic key management service may use a security module to generate a cryptographic key pair that can be used to enable a customer to import its customer cryptographic key. Further, the security module may use the customer cryptographic key, along with a domain cryptographic key, to generate an encrypted key token that is available for performance of cryptographic operations. Accordingly, FIG. 4 shows an illustrative example of an environment 400 in which a security module 404 of a cryptographic key management service stores imported customer cryptographic keys for use in cryptographic operations in accordance with at least one embodiment. In the environment 400, a cryptographic key provisioning engine 402 of the cryptographic key management service may transmit, in response to a customer request to import a customer cryptographic key, a notification to the security module 404 indicating that the request to import the customer cryptographic key has been received.

The security module 404 may include a key import processing engine 406, which may be an application installed on a computer system of the security module 404 that processes incoming requests from customers to import cryptographic keys and to generate encrypted key tokens based at least in part on the imported cryptographic keys. In response to the indication from the cryptographic key provisioning engine 402 regarding a customer request to import a customer cryptographic key, the key import processing engine 406 may create a cryptographic key pair that can be used to facilitate import of the customer cryptographic key. The cryptographic key pair may be created using one or more public cryptographic key cryptosystems, such as RSA or any other asymmetric cryptographic key algorithm (e.g., elliptic curve cryptography, etc.).

The private cryptographic key generated by the key import processing engine 406 may be serialized with an expiration date that is based at least in part on the validity period for the cryptographic key pair. This validity period may be encoded into the key import processing engine 406, may be set by an administrator of the cryptographic key management service, or by the computing resource service provider. The key import processing engine 406 may access a domain cryptographic key datastore 410 to obtain the active domain cryptographic key for the cryptographic key management service and utilize the domain cryptographic key to encrypt the private cryptographic key, creating an import key token for the customer. The key import processing engine 406 may store the import key token in the token container 412. Additionally, or alternatively, the key import processing engine 406 may provide the import key token to the cryptographic key provisioning engine 402, which may provide the import key token to the customer in response to its request. The key import processing engine 406 may also provide the public cryptographic key of the newly generated cryptographic key pair to the cryptographic key provisioning engine 402, which may provide the public cryptographic key to the customer.

As described above, a customer may use the public cryptographic key provided by the cryptographic key provisioning engine 402 to encrypt its customer cryptographic key that is to be imported. The customer may transmit this encrypted customer cryptographic key, as well as the import key token, to the cryptographic key provisioning engine 402. The customer may also specify a desired expiration date for the customer cryptographic key in its response to the cryptographic key provisioning engine 402. The cryptographic key provisioning engine 402 may provide the encrypted customer cryptographic key and the import key token to the key import processing engine 406 of the security module 404 for processing.

The key import processing engine 406 may evaluate the received import key token to determine whether the import key token has expired. For instance, the key import processing engine 406 may use the domain cryptographic key from the domain cryptographic key datastore 410 to decrypt the import key token and obtain the expiration date for the private cryptographic key. Alternatively, the key import processing engine 406 may evaluate a database or table comprising key-value entries for each import key token identifier. Using the database or table of key-value entries for import key tokens, the key import processing engine 406 may use the import key token identifier to identify an entry corresponding to the import key token. This entry may specify the expiration date for the import key token.

If the import key token has expired, the key import processing engine 406 may transmit a notification to the cryptographic key provisioning engine 402 indicating that the request to import the customer cryptographic key is to be denied. This may cause the cryptographic key provisioning engine 402 to deny the customer's request to import its customer cryptographic key. However, if the import key token has not expired, the key import processing engine 406 may use the domain cryptographic key to decrypt the import key token to obtain the private cryptographic key. The key import processing engine 406 may use the private cryptographic key to decrypt the encrypted customer cryptographic key. The key import processing engine 406 may store the customer cryptographic key within the imported cryptographic key datastore 408. Additionally, the key import processing engine 406 may use the domain cryptographic key to encrypt the customer cryptographic key, resulting in the creation of the encrypted key token 414. The encrypted key token 414 may be encoded with an expiration date for the encrypted key token 414 as specified by the customer in its request to import the customer cryptographic key. The key import processing engine 406 may store the newly created encrypted key token 414 in a token container 412 to make the encrypted key token 414 available for cryptographic operations. Further, the key import processing engine 406 may update the metadata of the customer's customer master key to store the expiration date of the encrypted key token 414.

Figure 5:
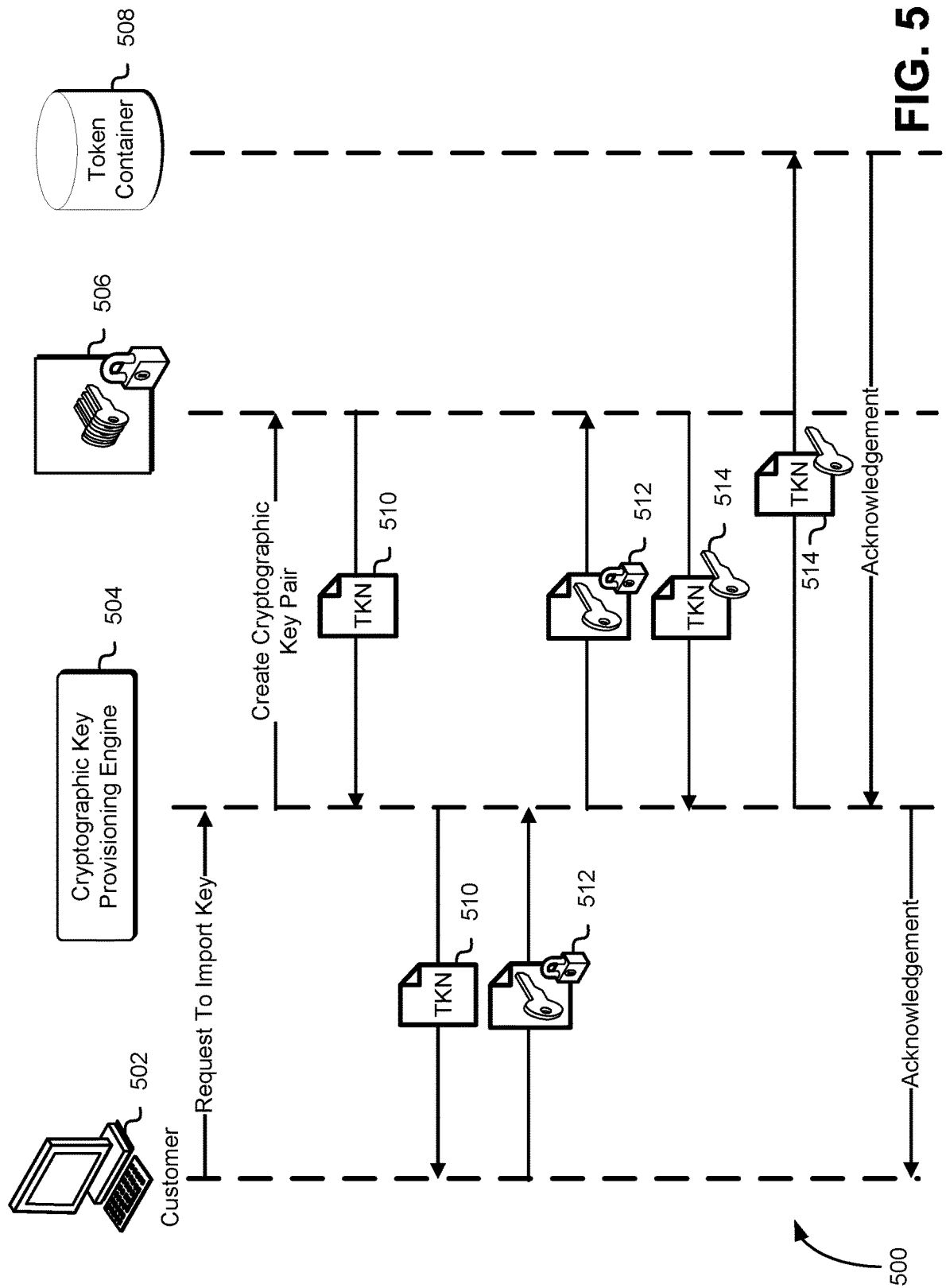
FIG. 5 shows an illustrative example of a workflow diagram for processing a request to import a customer cryptographic key in accordance with at least one embodiment.

FIG. 5 shows an illustrative example of a workflow diagram 500 for processing a request to import a customer cryptographic key in accordance with at least one embodiment. A customer of a computing resource service provider, through a client device 502 or other client, may transmit a request to the cryptographic key management service to import a customer cryptographic key to the service. In the request or at any time prior to the request, the customer, through the client device 502 may access the cryptographic key management service to create a customer master key. The customer master key may include metadata, provided by the customer, which may specify any access policies that are applicable to the customer master key and any customer cryptographic keys that are associated with the customer master key. Additionally, the customer may define, through the metadata, one or more aliases for the customer master key that may be used to identify the customer master key for requests to perform cryptographic operations. The metadata may further specify the cryptographic algorithms (e.g., Rivest-Shamir-Adleman (RSA), elliptic curve cryptography, etc.) that can be used for encryption of the customer cryptographic keys.

In response to the customer request to import a customer cryptographic key, the cryptographic key provisioning engine 504 of the cryptographic key management service may transmit a request to a security module 506 of the service to create a new cryptographic key pair that can be used to facilitate importation of the customer cryptographic key. Based at least in part on the customer preferences for cryptographic algorithms, the security module 506 may use the customer's preferred cryptographic algorithm to generate the new cryptographic key pair. The security module 506 may serialize the private cryptographic key of the cryptographic key pair with an expiration date based at least in part on the validity period for the cryptographic key pair. This validity period may be determined by an administrator of the cryptographic key management service or the computing resource service provider which provides the cryptographic key management service to its customers. The security module may use the domain cryptographic key of the cryptographic key management service to encrypt the private cryptographic key, producing an import key token. In some embodiments, the security module 506 may maintain a database of import key tokens, which may include entries for each import key token generated. Each of these entries may specify an identifier of an import key token and a corresponding expiration date for the token.

The security module 506 may transmit the newly created import key token 510 and the public cryptographic key of the cryptographic key pair to the cryptographic key provisioning engine 504 which may provide the import key token 510 and the public cryptographic key to the customer's client device 502. The customer, through its client device 502, may use the public cryptographic key provided by the cryptographic key provisioning engine 504 to encrypt its customer cryptographic key to produce the encrypted customer cryptographic key 512. In an embodiment, if the customer utilizes its own security module to generate and maintain its customer cryptographic keys, the customer may provide the import key token 510 and the public cryptographic key to this security module. The customer's security module may thus instead utilize the public cryptographic key to encrypt the customer cryptographic key that is to be imported. The customer's security module may provide the encrypted customer cryptographic key 512 and the import key token to the customer's client device 502.

The customer, through the client device 502, may transmit the encrypted customer cryptographic key 512 and the import key token to the cryptographic key provisioning engine 504. The cryptographic key provisioning engine 504 may provide the received encrypted customer cryptographic key 512 and the import key token to the security module 506 for processing. The security module 506 may evaluate the received import key token to determine whether it has expired. For instance, the security module 506 may access the import key token database and use an identifier of the received import key token to identify an entry corresponding to the import key token. Using the entry, the security module 506 may determine whether the import key token has expired. In an alternative embodiment, the security module 506 can use the domain cryptographic key to decrypt the import key token and evaluate the expiration date serialized therein to determine whether the import key token has expired. If the import key token has expired, the security module 506 may transmit a notification to the cryptographic key provisioning engine 504 to indicate that the request to import the customer cryptographic key should be denied.

In some embodiments, the security module 506 stores the import key token 510 in the token container 508 and provides an identifier of the import key token 510 to the cryptographic key provisioning engine 504, which provides the identifier to the client device 502. The security module 506 may maintain a mapping of import key token identifiers to the import key tokens stored in the token container 508. The client device 502 may provide the encrypted customer cryptographic key 512 and the import key token identifier to the cryptographic key provisioning engine 504, which provides the encrypted customer cryptographic key token 512 and the identifier to the security module 506. The security module 506 may use the identifier provided by the client device 502 to identify the corresponding import key token, which the security module 506 may evaluate as described above.

If the import key token has not expired, the security module 506 may use its domain cryptographic key to decrypt the import key token to obtain the private cryptographic key of the cryptographic key pair. The security module 506 may use the private cryptographic key from the import key token to decrypt the provided encrypted customer cryptographic key 512. As described above, a customer may specify a desired expiration date for its customer cryptographic key. As a result, the security module 506 may set the expiration date for the customer cryptographic key and use the domain cryptographic key to encrypt the customer cryptographic key, resulting in an encrypted key token 514. The security module 506 may provide the encrypted key token 514 to the cryptographic key provisioning engine 504.

The cryptographic key provisioning engine 504 may store the generated encrypted key token 514 in a token container 508 of the cryptographic key management service, thereby making the encrypted key token 514 available for use in cryptographic operations. The token container 508 may transmit an acknowledgment to the cryptographic key provisioning engine 504 to indicate that the encrypted key token 514 has been stored and cataloged successfully. This may cause the cryptographic key provisioning engine 504 to transmit a notification to the customer's client device 502 or to the customer itself indicating that the customer cryptographic key has been successfully imported into the cryptographic key management service and is available for performance of cryptographic operations. For instance, the cryptographic key management service may use the customer cryptographic key to derive one or more cryptographic keys for the purpose of performing the cryptographic operations.

Figure 6:
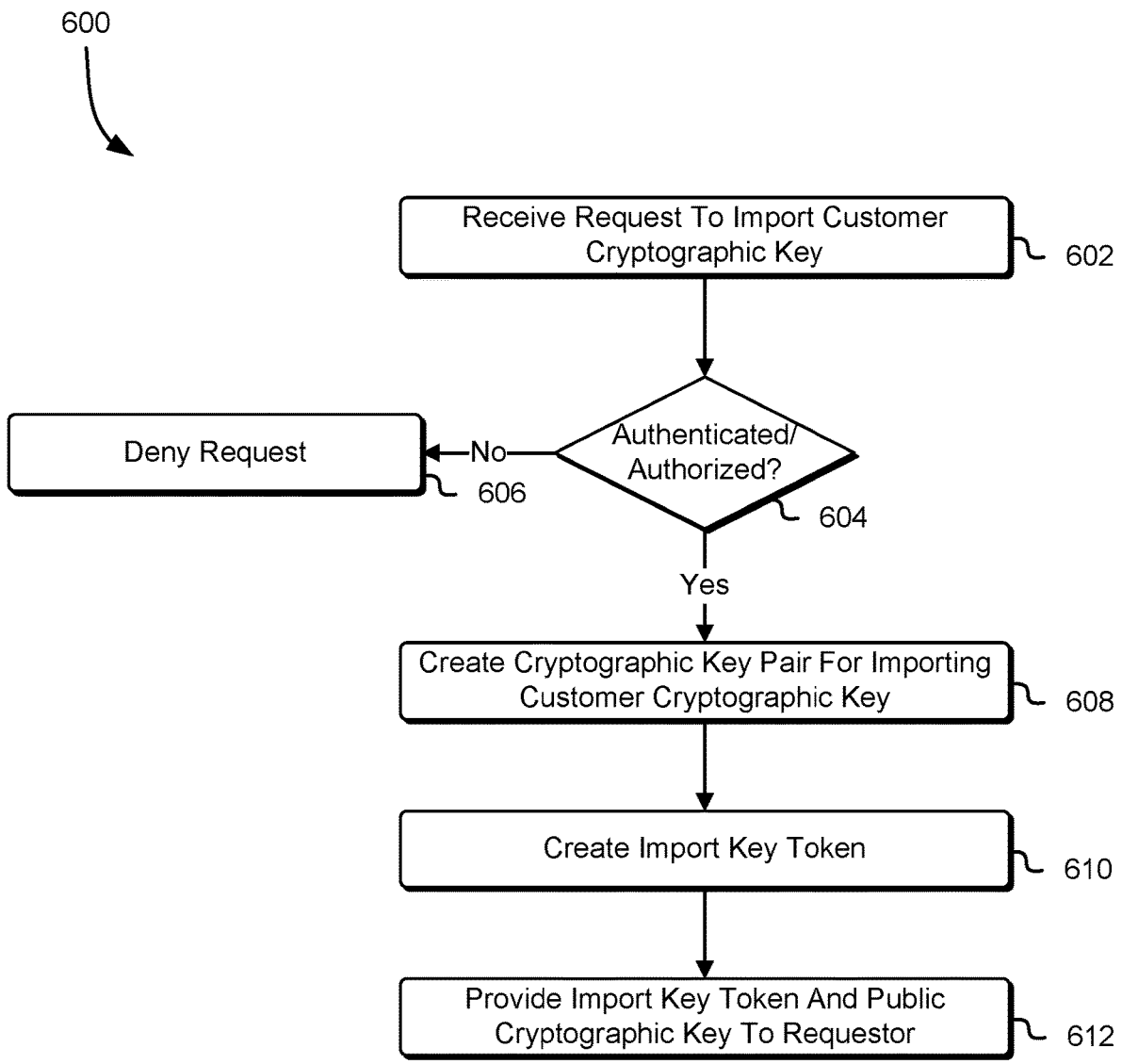
FIG. 6 shows an illustrative example of a process for generating an import key token in response to a request to import a customer cryptographic key in accordance with at least one embodiment.

As noted above, a customer may submit a request to the cryptographic key management service to import a customer cryptographic key for use in performing cryptographic operations. The request may specify an identifier of a customer master key, for which the customer may provide metadata specifying policies and grants that may be used to control access to the customer cryptographic key that is to be associated with the customer master key. Additionally, the metadata may specify one or more identifiers or aliases for the customer master key and the customer cryptographic key that is to be imported to the cryptographic key management service. In response to the request, the cryptographic key management service may generate a cryptographic key pair and an import key token, both of which may be used to facilitate the importation of the customer cryptographic key. Accordingly, FIG. 6 shows an illustrative example of a process 600 for generating an import key token in response to a request to import a customer cryptographic key in accordance with at least one embodiment. The process 600 may be performed by the aforementioned cryptographic key management service, which may include one or more security modules for the creation of cryptographic keys that may be used to facilitate the importation of customer cryptographic keys to the service.

In an embodiment, a customer of the computing resource service provider submits a request to the cryptographic key management service to create a logical imported customer master key. The customer master key may have no associated customer cryptographic keys and may not be usable for any cryptographic operations. The customer, in its request, may provide metadata for the customer master key, which may specify one or more access policies for the customer master key, one or more aliases for the customer master key, an expiration date for the customer master key, and the like. If the customer master key is created successfully, the customer may submit a request to the cryptographic key management service to import a customer cryptographic key to the customer master key for use in cryptographic operations. The cryptographic key management service may receive 602 the request to import the customer cryptographic key. The request may specify an identifier of the customer master key, a proposed identifier for the customer cryptographic key, an expiration date for the customer cryptographic key, and the like.

In response to the request, the cryptographic key management service may determine 604 whether the customer can be authenticated and is authorized to import a customer cryptographic key into the customer master key. For instance, if the request includes a unique user identifier for the customer and a corresponding set of credentials or proof of access to the credentials, the cryptographic key management service may transmit the unique user identifier and the provided credentials or proof of access to the credentials to an authentication service of the computing resource service provider. The authentication service may evaluate the provided information to determine whether the customer can be authenticated. For instance, the authentication service may access a user profile for the customer to obtain information that can be used to verify the provided information. If the authentication service determines that the information provided is valid and corresponds to the customer, the authentication service may authenticate the customer and transmit a notification to the cryptographic key management service to indicate that the client has been successfully authenticated.

If the customer cannot be authenticated or is not authorized to import a customer cryptographic key to the customer master key, the cryptographic key management service may deny 606 the request. However, if the customer has been successfully authenticated and is authorized to import a customer cryptographic key to the specified customer master key, the cryptographic key management service may create 608 a cryptographic key pair that can be used to facilitate the importation of the customer cryptographic key.

For instance, the cryptographic key management service may use a security module to generate a cryptographic key pair. The cryptographic key pair may be created using one or more public cryptographic key cryptosystems, such as RSA or any other asymmetric cryptographic key algorithm (e.g., elliptic curve cryptography, etc.). In an embodiment, if the customer, in its request, specifies a specific cryptographic algorithm that is to be used for the cryptographic key pair, the cryptographic key management service will cause the security module to use the identified cryptographic algorithm to generate the cryptographic key pair.

The cryptographic key management service, through the security module, may serialize the private cryptographic key of the generated cryptographic key pair with an expiration date. The expiration date may be based at least in part on a validity period for cryptographic keys generated by the security module. This validity period may be defined through the configuration of the security module or the cryptographic key management service, established by an administrator of the cryptographic key management service through a policy or other encoding. The cryptographic key management service use a domain cryptographic key to encrypt the private cryptographic key to create 610 an import key token. The import key token may be stored within a token container of the cryptographic key management service and may be assigned an identifier. An entry corresponding to this identifier may be added to a database of import key tokens. The entry may specify the expiration date of the private cryptographic key and, hence, of the import key token.

The cryptographic key management service may obtain the import key token and the public cryptographic key of the cryptographic key pair from the security module. In response to obtaining the import key token and the public cryptographic key, the cryptographic key management service may provide 612 the import key token and the public cryptographic key to the customer or other requestor that may have submitted the request to import the customer cryptographic key. The customer or requestor is not provided with the domain cryptographic key used to create the import key token in order to prevent the customer or requestor from accessing the private cryptographic key encrypted therein. In some embodiments, the customer or requestor is not provided with the import key token, as the import key token may be stored in the token container. Thus, the customer or requestor may be provided with an identifier of the import key token, which may be provided with the customer cryptographic key during importation of the customer cryptographic key.

Figure 7:
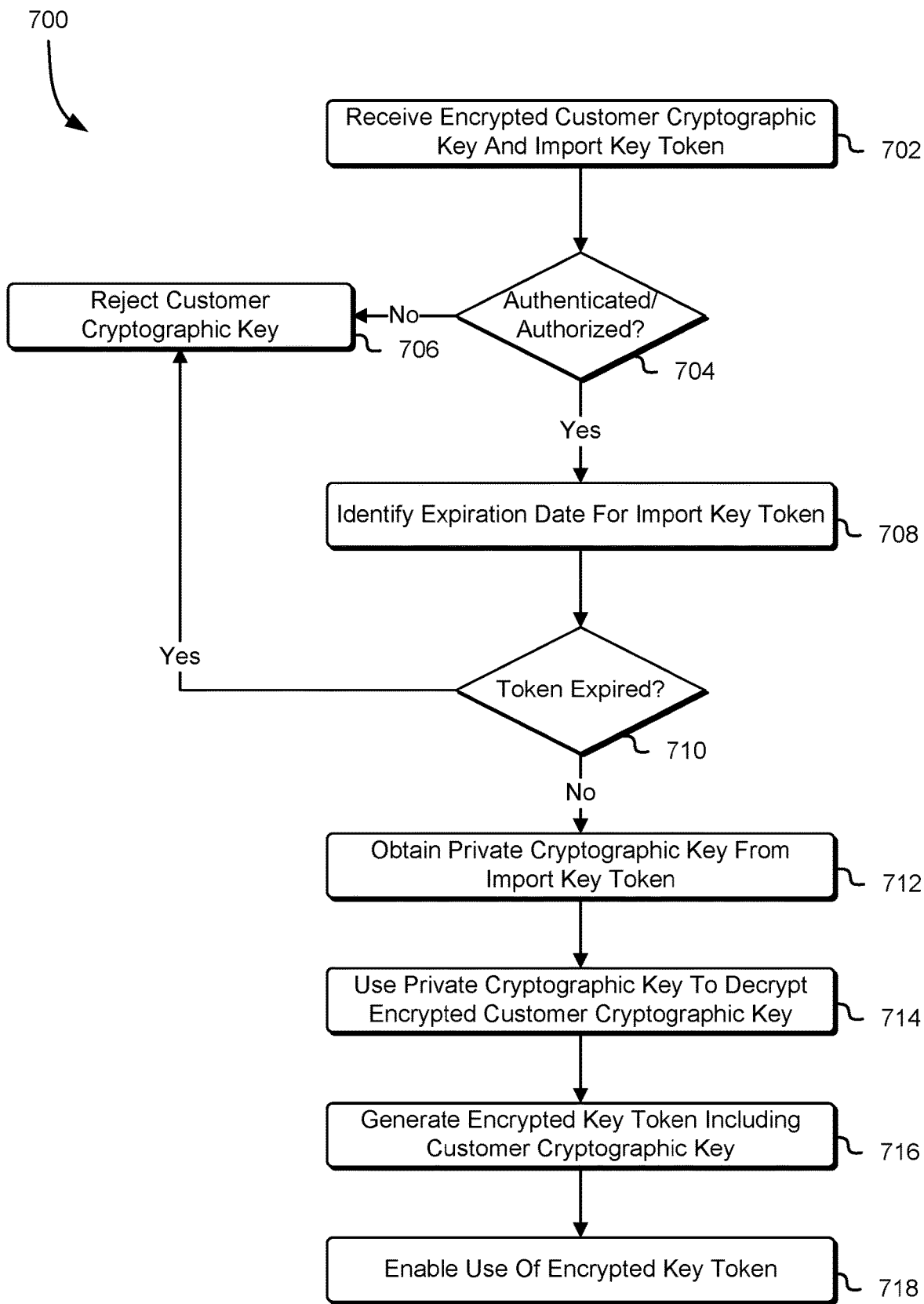
FIG. 7 shows an illustrative example of a process for implementing an imported customer cryptographic key in accordance with at least one embodiment.

As noted above, a customer or other requestor that receives the import key token and the public cryptographic key from the cryptographic key management service may use the public cryptographic key to encrypt its customer cryptographic key. The customer or requestor may transmit the import key token and the encrypted customer cryptographic key to the cryptographic key management service to enable the service to associate the customer cryptographic key with the customer master key identified in the original request to import a customer cryptographic key. The cryptographic key management service may decrypt the encrypted customer cryptographic key and use the customer cryptographic key to generate an encrypted key token, which the cryptographic key management service may associate with the specified customer master key. Accordingly, FIG. 7 shows an illustrative example of a process 700 for implementing an imported customer cryptographic key in accordance with at least one embodiment. The process 700 may be performed by the aforementioned cryptographic key management service in conjunction with a security module implemented by the service.

A customer or other requestor that has received an import key token and a public cryptographic key from the cryptographic key management service may utilize the public cryptographic key to encrypt its customer cryptographic key. In some embodiments, if the customer or other requestor maintains its own security module for the generation and management of customer cryptographic keys, the customer or other requestor provides the import key token and the public cryptographic key to the security module. This security module may utilize the public cryptographic key to encrypt the customer cryptographic key that is to be imported. The customer or other requestor may provide the encrypted customer cryptographic key and the import key token to the cryptographic key management service for importation. Thus, the cryptographic key management service may receive 702 the encrypted customer cryptographic key and the import key token from the customer or other requestor.

In response to receiving the encrypted customer cryptographic key and the import key token from the customer or other requestor, the cryptographic key management service may determine 704 whether the customer or other requestor can be successfully authenticated and is authorized to import the customer cryptographic key. If the customer or other requestor cannot be successfully authenticated or, based at least in part on the policies applicable to the request, the customer or other requestor is not authorized to import the customer cryptographic key token, the cryptographic key management service may reject 706 the customer cryptographic key. In some embodiments, the cryptographic key management service determines that the customer or other requestor is authorized to import the cryptographic key token based at least in part on the evaluation performed in response to the original request, as described above in connection with FIG. 6. Thus, the customer or requestor need not be subject to an additional authentication or authorization evaluation for the importation of the customer cryptographic key.

The cryptographic key management service may evaluate the received import key token to identify 708 the expiration date for the import key token. For instance, the cryptographic key management service may access the database of import key tokens to identify an entry corresponding to the identifier of the received import key token. The entry may specify the expiration date for the import key token. Alternatively, the cryptographic key management service, through a security module, may use the domain cryptographic key to decrypt the import key token to obtain the serialized expiration date encoded therein. Based at least in part on the expiration date identified for the import key token, the cryptographic key management service may determine 710 whether the import key token is expired. If the import key token is expired, the cryptographic key management service may reject 706 the customer cryptographic key provided by the customer or requestor.

If the import key token is not expired, the cryptographic key management service, through use of the security module, may use the domain cryptographic key to decrypt the import key token. Alternatively, if the import key token was decrypted in order to determine whether the import key token was expired, the cryptographic key management service may obtain 712 the private cryptographic key from the import key token. The security module may use 714 the private cryptographic key to decrypt the encrypted customer cryptographic key provided by the customer or other requestor. In some embodiments, if the import key token is not expired and the import key token is maintained within the token database, the security module will obtain the import key token from the token container and decrypt the import key token using the domain cryptographic key.

The security module may obtain, from the metadata for the customer master key or from the customer or other requestor itself, the expiration date for the customer cryptographic key. The security module may serialize the customer cryptographic key with this expiration date and utilize the domain cryptographic key to encrypt the customer cryptographic key. The encryption of the customer cryptographic key may result in the security module generating 716 an encrypted key token that includes the customer cryptographic key. The encrypted key token may be stored in the token datastore to enable 718 use of the encrypted key token for cryptographic operations. Additionally, the security module may store the expiration date for the encrypted key token in the metadata for the customer master key. Thus, if a user submits a request to perform a cryptographic operation using the customer master key, the cryptographic key management service may identify the encrypted key token and use the encrypted key token to perform the cryptographic operation.

Figure 8:
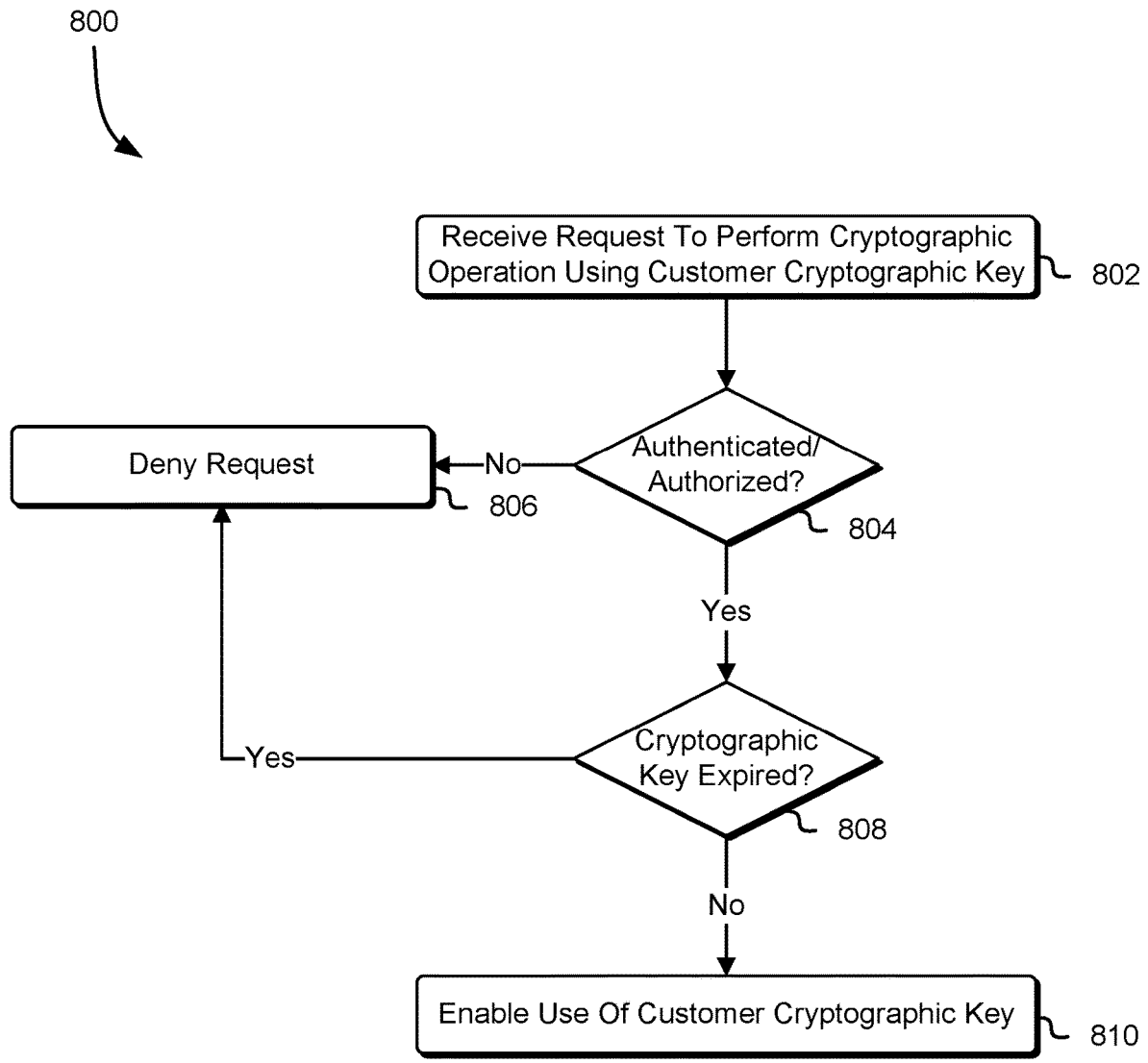
FIG. 8 shows an illustrative example of a process for performing a cryptographic operation using an imported cryptographic key in accordance with at least one embodiment.

As noted above, the cryptographic key management service, in response to a request from a customer or other user to utilize a customer cryptographic key to perform one or more cryptographic operations, may evaluate the customer cryptographic key specified in the request to determine whether customer cryptographic key has expired and to determine whether the customer or user is authorized to enable use of the customer cryptographic key for the requested cryptographic operations. Accordingly, FIG. 8 shows an illustrative example of a process 800 for performing a cryptographic operation using an imported cryptographic key in accordance with at least one embodiment. The process 800 may be performed by the cryptographic key management service, which may process incoming requests from customers and other users of the computing resource service provider to utilize customer cryptographic keys to perform cryptographic operations.

At any time, the cryptographic key management service may receive 802 a request to utilize a customer cryptographic key to perform one or more cryptographic operations. For instance, a customer or other user may submit a request to the service to cause the service to use a customer cryptographic key to decrypt data maintained by another computing resource service provided by the computing resource service provider. The request may specify a unique principal identifier, an identifier for the customer cryptographic key or customer master key, and the like. Additionally, the request may include one or more credentials or information that may be used to determine that the customer or other user has access to the one or more credentials of the customer or other user.

In response to the request, the cryptographic key management service may determine 804 whether the customer or other user can be authenticated and is authorized to enable use of the customer cryptographic key for performance of the one or more cryptographic operations. The cryptographic key management service may transmit the unique user identifier and the provided credentials or proof of access to the credentials to an authentication service of the computing resource service provider. The authentication service may evaluate the provided information to determine whether the customer or other user can be authenticated. For instance, the authentication service may access a user profile for the customer or other user to obtain information that can be used to verify the provided information. If the authentication service determines that the information provided is valid and corresponds to the customer or other user, the authentication service may authenticate the customer or other user and transmit a notification to the cryptographic key management service to indicate that the customer or other user has been successfully authenticated.

If the customer or other user cannot be authenticated or is not authorized to enable use of the cryptographic key, the cryptographic key management service may deny 806 the customer's or other user's request. However, if the cryptographic key management service determines that the customer or other user has been successfully authenticated and that it is authorized to enable use of the customer cryptographic key, the cryptographic key management service may determine 808 whether the specified customer cryptographic key is expired. For instance, the cryptographic key management service may access the customer master key specified in the request and evaluate the metadata for the customer master key to identify the expiration date for the customer cryptographic key encrypted in the encrypted key token. If the expiration date has passed or the service is unable to retrieve the encrypted key token specified in the customer master key metadata (e.g., the encrypted key token has been deleted), the cryptographic key management service may determine that the customer cryptographic key has expired. In some embodiments, if the customer cryptographic key is expired, the cryptographic key management service will disassociate the customer cryptographic key from the customer master key and remove the customer cryptographic key (e.g., the customer cryptographic key is deleted from the security module of the cryptographic key management service such that the customer cryptographic key is no longer available for use). If the customer cryptographic key has expired, the cryptographic key management service may deny 806 the request.

If the customer cryptographic key has not expired, the cryptographic key management service may enable 810 use of the customer cryptographic key to perform the one or more cryptographic operations. For instance, the cryptographic key management service may use the domain cryptographic key to decrypt the encrypted key token that contains the customer cryptographic key. The cryptographic key management service may use the newly available customer cryptographic key, on behalf of the customer or other user, to decrypt the requested data and may provide the data to the customer or other user for its use. Alternatively, the cryptographic key management service may use the customer cryptographic key, on behalf of the customer or other user, to encrypt data specified in the request and may store the encrypted data on behalf of the customer or other user.

Figure 9:
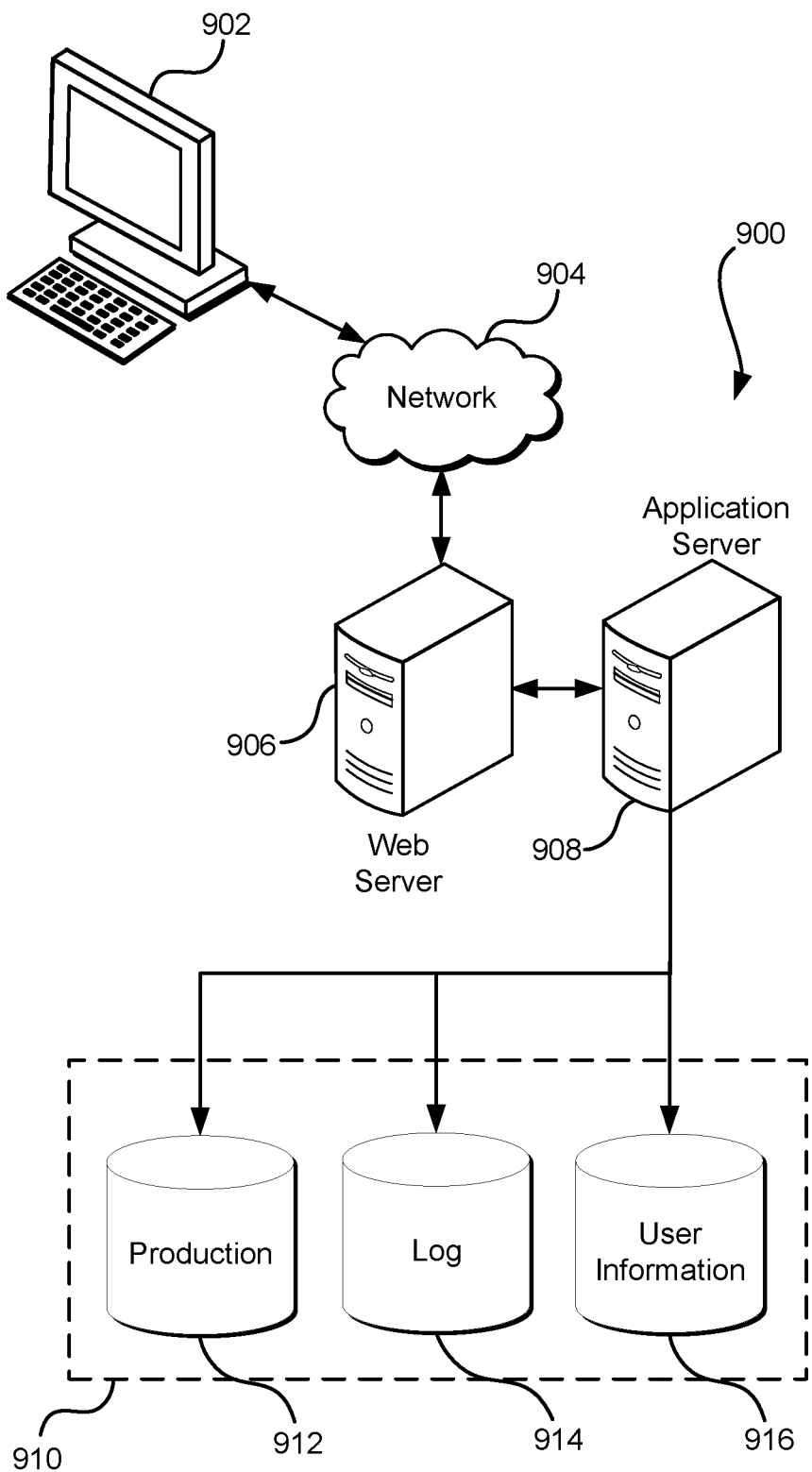
FIG. 9 shows an illustrative example of an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904, and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes, and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these, and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable, and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a request to import a first cryptographic key;
   creating a cryptographic key pair comprising a public cryptographic key and a private cryptographic key;
   utilizing the private cryptographic key using a domain cryptographic key to generate an import key token;
   providing the import key token and the public cryptographic key;
   obtaining an encrypted first cryptographic key, the encrypted first cryptographic key being the first cryptographic key encrypted using the public cryptographic key;
   decrypting the import key token using the domain cryptographic key to derive information for decrypting the encrypted first cryptographic key;
   decrypting the encrypted first cryptographic key using the information; and
   causing cryptographic operations to be performed using the first cryptographic key.

2. The computer-implemented method of claim 1, wherein the method further comprises:
   obtaining a second request to import a second cryptographic key;
   providing the import key token and the public cryptographic key;
   obtaining the import key token and a second encrypted cryptographic key, the second encrypted cryptographic key being the second cryptographic key encrypted using the public cryptographic key;

determining that the import key token has expired; and
deny the second request.

3. The computer-implemented method of claim 1, wherein:
the request to import the first cryptographic key specifies an expiration date for the first cryptographic key; and
the method further comprises removing the first cryptographic key as a result of passing the expiration date for the first cryptographic key.

4. The computer-implemented method of claim 1, wherein:
the method further comprises:
obtaining a request to create a master key for establishing access controls to the first cryptographic key, the request specifying a set of access control policies defining the access controls to the first cryptographic key;
associating the import key token with the master key; and
causing the cryptographic operations to be performed occurs as a result of a request to use the master key for performance of the cryptographic key operations.

5. The computer-implemented method of claim 4, wherein the method further comprises:
detecting that the import key token has expired; and
as a result of the import key token expiring, disassociating the import key token from the master key.

6. The computer-implemented method of claim 1, wherein:
the request to import the first cryptographic key specifies a public cryptographic key cryptosystem for providing the first cryptographic key; and
the method further comprises using the public cryptographic key cryptosystem specified in the request to generate the cryptographic key pair.

7. A system, comprising:
one or more processors; and
memory including instructions that, as a result of being executed by the one or more processors, cause the system to:
create, in response to a request to import a first cryptographic key, a cryptographic key pair comprising a public cryptographic key and a private cryptographic key;
generate, using a domain cryptographic key against the private cryptographic key, an import key token;
provide the import key token and the public cryptographic key;
obtain the import key token and an encrypted first cryptographic key, the encrypted first cryptographic key being the first cryptographic key encrypted using the public cryptographic key;
decrypt, using the domain cryptographic key, the import key token;
decrypt, using the import key token, the encrypted first cryptographic key to obtain the first cryptographic key; and
cause cryptographic operations to be performed using the first cryptographic key.

8. The system of claim 7, wherein the instructions further cause the system to utilize a Diffie-Hellman algorithm to generate the cryptographic key pair.

9. The system of claim 7, wherein the instructions further cause the system to:
identify, from the request to import the first cryptographic key, an expiration date for the first cryptographic key;

determine, based on the expiration date, that the first cryptographic key is expired; and
as a result of expiration of the first cryptographic key, delete the first cryptographic key.

10. The system of claim 7, wherein the instructions further cause the system to:
associate the first cryptographic key with a master key, the master key associated with a set of access control policies for controlling access to the first cryptographic key;
obtain a request to perform a cryptographic operation, the request specifying an identifier of the master key; and
use the first cryptographic key to perform the cryptographic operation.

11. The system of claim 10, wherein the instructions further cause the system to:
determine that the first cryptographic key has expired;
disassociate the first cryptographic key from the master key; and
delete the first cryptographic key.

12. The system of claim 7, wherein the instructions that cause the system to generate the import key token further cause the system to encrypt, using a domain cryptographic key, the private cryptographic key to generate the import key token.

13. A non-transitory computer-readable storage medium storing thereon executable instructions that, as a result of being executed by one or more processors of a computer system of a cryptographic key management service, cause the computer system to:
generate, in response to a request to import a key, first cryptographic information and second cryptographic information;
generate, using a domain cryptographic key and based at least in part on the first cryptographic information, an import key token;
provide the import key token and the second cryptographic information in response to the request;
derive, using the domain cryptographic key, from the import key token and in response to obtaining an encrypted key, the first cryptographic information;
use the first cryptographic information to decrypt the encrypted key to obtain the key; and
store the key for performance of cryptographic operations.

14. The non-transitory computer-readable storage medium of claim 13, wherein the instructions further cause the computer system to:
obtain a request to perform a cryptographic operation using the key;
determine that the key has expired; and
deny the request.

15. The non-transitory computer-readable storage medium of claim 13, wherein the instructions further cause the computer system to use a Rivest-Shamir-Adleman algorithm to generate the first cryptographic information and the second cryptographic information.

16. The non-transitory computer-readable storage medium of claim 13, wherein the instructions further cause the computer system to, based at least in part on a determination that the import key token has expired, reject the encrypted key.

17. The non-transitory computer-readable storage medium of claim 13, wherein the instructions that cause the system to store the key for performance of the cryptographic operations further cause the system to:
obtain a domain key;

encrypt, using the domain key, the key to generate an encrypted key token; and make the encrypted key token available for performance of the cryptographic operations.

18. The non-transitory computer-readable storage medium of claim 13, wherein:

the request to import the key specifies an expiration date for the key; and the instructions further cause the computer system to delete the key as a result of a determination that the expiration date has passed.

19. The non-transitory computer-readable storage medium of claim 13, wherein the instructions further cause the computer system to:

associate the key with a master key;

obtain a request to perform a cryptographic operation, the request specifying an identifier of the master key;

determine, based at least in part on policies associated with the master key, that the request can be fulfilled; and use the key to fulfill the request in accordance with the policies.

20. The non-transitory computer-readable storage medium of claim 19, wherein the instructions further cause the computer system to:

determine that the key has expired; and as a result of expiration of the key, disassociate the key from the master key.

\* \* \* \* \*